United States Patent
Zong et al.

(10) Patent No.: US 12,167,229 B2
(45) Date of Patent: Dec. 10, 2024

(54) POLICY MANAGEMENT METHOD AND APPARATUS

(71) Applicant: Huawei Technologies Co., Ltd., Shenzhen (CN)

(72) Inventors: Zaifeng Zong, Nanjing (CN); Xiaoyun Zhou, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 485 days.

(21) Appl. No.: 17/406,733

(22) Filed: Aug. 19, 2021

(65) Prior Publication Data
US 2021/0385723 A1    Dec. 9, 2021

Related U.S. Application Data

(63) Continuation of application No. PCT/CN2020/075786, filed on Feb. 19, 2020.

(30) Foreign Application Priority Data

Feb. 19, 2019   (CN) .......................... 201910122829.1

(51) Int. Cl.
  *H04W 36/22*  (2009.01)
  *H04L 12/14*  (2024.01)
(52) U.S. Cl.
  CPC .......... *H04W 36/22* (2013.01); *H04L 12/1407* (2013.01)
(58) Field of Classification Search
  CPC ..... H04W 36/32; H04W 36/08; H04W 36/22; H04L 12/1407
  See application file for complete search history.

(56) References Cited

U.S. PATENT DOCUMENTS 11,026,080 B2 *  6/2021  Wu .......................... H04W 8/14
11,071,167 B2 *  7/2021  Yang ...................... H04W 76/12
(Continued)

FOREIGN PATENT DOCUMENTS

CN   108370600 A   8/2018
CN   108811011 A   11/2018
(Continued)

OTHER PUBLICATIONS

Ericsson, "Conclusion update on nature of information carried over Nxx," SA WG2 Meeting #129-81S S2-1811723, Nov. 26-30, 2018, West Palm Beach, USA, 4 pages.
(Continued)

*Primary Examiner* — Michael J Moore, Jr.
(74) *Attorney, Agent, or Firm* — Conley Rose, P.C.

(57) ABSTRACT

A method includes: receiving first information, where the first information indicates a data network to which a first anchor user plane function (UPF) network element managed by a second session management function (SMF) network element is connected; determining based on the first information, first rule information to be executed by a first network element managed by the second SMF network element, where the first network element includes at least one of the first anchor UPF network element or a branching point connected to the first anchor UPF network element, where the branching point is a UPF network element having a traffic offload function, where the first rule information indicates a processing method to be performed on a data packet of a first application, and where the data packet of the first application is transmitted through the first anchor UPF network element; and sending second information including the first rule information.

20 Claims, 5 Drawing Sheets

(56) References Cited

U.S. PATENT DOCUMENTS

| | | | |
|---|---|---|---|
| 2017/0339609 A1 | 11/2017 | Youn et al. | |
| 2018/0192390 A1 | 7/2018 | Li et al. | |
| 2018/0192471 A1* | 7/2018 | Li | H04W 12/06 |
| 2018/0199243 A1* | 7/2018 | Bharatia | H04W 36/0066 |
| 2019/0053105 A1 | 2/2019 | Park et al. | |
| 2019/0098536 A1* | 3/2019 | Qiao | H04W 36/326 |
| 2019/0158408 A1* | 5/2019 | Li | H04L 45/306 |
| 2019/0373461 A1* | 12/2019 | Ito | H04W 12/106 |
| 2020/0007590 A1* | 1/2020 | Dodd-Noble | H04L 65/1069 |
| 2020/0008109 A1* | 1/2020 | Li | H04W 80/10 |
| 2020/0015066 A1* | 1/2020 | Zhu | H04W 8/10 |
| 2020/0015131 A1* | 1/2020 | Ying | H04W 48/18 |
| 2020/0068587 A1* | 2/2020 | Garcia Azorero | H04W 76/10 |
| 2020/0077329 A1* | 3/2020 | Zhu | H04W 36/32 |
| 2020/0137828 A1* | 4/2020 | Yang | H04W 76/12 |
| 2020/0169639 A1 | 5/2020 | Chai | |
| 2020/0170055 A1 | 5/2020 | Dou et al. | |
| 2020/0229042 A1* | 7/2020 | Srivastava | H04L 67/148 |
| 2020/0323029 A1* | 10/2020 | Lu | H04W 76/25 |
| 2020/0374951 A1* | 11/2020 | Yao | H04W 74/002 |
| 2020/0389811 A1* | 12/2020 | Guo | H04W 76/20 |
| 2021/0014720 A1* | 1/2021 | Li | H04M 15/66 |
| 2021/0022047 A1* | 1/2021 | Zong | H04W 76/12 |
| 2021/0029586 A1* | 1/2021 | Zhu | H04L 67/14 |
| 2021/0219357 A1* | 7/2021 | Talebi Fard | H04L 67/14 |
| 2021/0345117 A1* | 11/2021 | Zhang | H04W 12/63 |
| 2021/0345174 A1* | 11/2021 | Wu | H04W 28/0268 |
| 2021/0368427 A1* | 11/2021 | Rommer | H04W 48/16 |
| 2021/0385723 A1 | 12/2021 | Zong et al. | |
| 2021/0392561 A1* | 12/2021 | Liang | H04W 8/22 |
| 2022/0248290 A1* | 8/2022 | Ying | H04W 76/19 |

FOREIGN PATENT DOCUMENTS

| | | |
|---|---|---|
| CN | 108882305 A | 11/2018 |
| CN | 108934007 A | 12/2018 |
| CN | 109121170 A | 1/2019 |
| CN | 109167847 A | 1/2019 |
| CN | 109218032 A | 1/2019 |
| CN | 110324152 A | 10/2019 |
| CN | 110324388 A | 10/2019 |
| CN | 111586602 B | 7/2021 |

OTHER PUBLICATIONS

Huawei, et al., "Update to Solution #15 to add location information of 1-SMF," SA WG2 Meeting #128bis S2-188760, Aug. 20-24, 2018, Sophia Antipolis, France, 4 pages.

Huawei et al., "ETSUN Conclusion: UL-CL controlled by 1-SMF," SA WG2 Meeting #129bis S2-1812150, Nov. 26-30, 2018, West Palm Beach, USA, 5 pages.

3GPP TS 23.502 V15.4.1 "3rd Generation Partnership Project;Technical Specification Group Services and System Aspects;Procedures for the 5G System;Stage 2 (Release 15)" Jan. 2019, 347 pages.

3GPP TS 23.501 V15.4.0 "3rd Generation Partnership Project;Technical Specification Group Services and System Aspects;System Architecture for the 5G System;Stage 2(Release 15)" Dec. 2018, 236 pages.

3GPP TS 23.503 V15.4.0 "3rd Generation Partnership Project; Technical Specification Group Services and System Aspects; Policy and Charging Control Framework for the 5G System; Stage 2 (Release 15)," Dec. 2018, 76 pages.

3GPP TS 29.244 V15.4.0 "3rd Generation Partnership Project; Technical Specification Group Core Network and Terminals; Interface between the Control Plane and the User Plane Nodes; Stage 3 (Release 15)," Dec. 2018, 194 pages.

Nokia et al., "PCF added as consumer of EventExposure service of AMF and SMF", 3GPP TSG-SA WG2 Meeting #128b S2-188156 (was S2-187584), Aug. 20-24, 2018, Sophia-Antipolis, France, 4 pages.

Huawei et al., "PCF added as consumer of EventExposure service of AMF and SMF", 3GPP TSG-SA WG2 Meeting #128bis S2-188330, Aug. 20-24, 2018, Sophia Antipolis, France, 6 pages.

Huawei et al., "PCF added as consumer of EventExposure service of AMF and SMF", 3GPP TSG-SA WG2 Meeting #128bis S2-188691 (revision of S2-188330), Aug. 20-24, 2018, Sophia Antipolis, France, 7 pages.

Huawei et al., "PCF added as consumer of EventExposure service of AMF and SMF", 3GPP TSG-SA WG2 Meeting #128bis S2-188828 (revision of S2-188691), Aug. 20-24, 2018, Sophia Antipolis, France, 6 pages.

Huawei et al., "PCF added as consumer of EventExposure service of AMF and SMF", 3GPP TSG-SA WG2 Meeting #128bis S2-188990 (revision of S2-188828), Aug. 20-24, 2018, Sophia Antipolis, France, 5 pages.

* cited by examiner

# POLICY MANAGEMENT METHOD AND APPARATUS

CROSS-REFERENCE TO RELATED APPLICATIONS

This application is a continuation of International Patent Application No. PCT/CN2020/075786, filed on Feb. 19, 2020, which claims priority to Chinese Patent Application No. 201910122829.1, filed on Feb. 19, 2019. The disclosures of the aforementioned applications are hereby incorporated by reference in their entireties.

TECHNICAL FIELD

This application relates to the field of communications technologies, and in particular, to a policy management method and apparatus.

BACKGROUND

In a 5th generation (5G) mobile communications technology, a concept of a service area of a session management function (SMF) network element is proposed. To be specific, the SMF network element manages only a user plane function (UPF) network element in the service area. In different areas, a terminal device may access data networks (DNS) via different UPF network elements, and SMF network elements that manage the different UPF network elements may be different.

In other approaches, in a first area managed by an anchor SMF network element, a first anchor UPF network element managed by the anchor SMF network element performs a processing method on a data packet in the first area. For example, the processing method includes charging, usage control, and quality of service control.

When the terminal device moves to a second area, an intermediate SMF network element has been inserted, and a second UPF network element and a branching point are inserted, to implement a user plane connection in the second area. Because a data packet in the second area is transmitted not through the first anchor UPF network element in the first area, the first anchor UPF network element in the first area cannot perform a processing method on the data packet in the second area. Therefore, how to perform a processing method on the data packet in the second area becomes an urgent problem to be resolved currently.

SUMMARY

Embodiments of this application provide a policy management method and apparatus.

According to one aspect, an embodiment of this application provides a method, where the method includes: receiving, by a first SMF network element, first information from a second SMF network element, where the first information is used to indicate a data network to which a first anchor UPF network element managed by the second SMF network element is connected; determining, by the first SMF network element based on the first information, first rule information to be executed by a first network element managed by the second SMF network element, where the first network element includes at least one of the first anchor UPF network element or a branching point, where the branching point is a UPF network element having a traffic offload function, where the branching point is connected to the first anchor UPF network element, where the first rule information is used to indicate a processing method to be performed on a data packet of a first application, and where the data packet of the first application is transmitted through the first anchor UPF network element; and sending, by the first SMF network element, second information to the second SMF network element, where the second information includes the first rule information.

According to the foregoing method, in a scenario shown in FIG. 1, when a data packet in an area 2 is transmitted not through a second anchor UPF network element in an area 1, at least one of a first anchor UPF network element or a branching point in the area 2 may perform a processing method on the data packet in the area 2. Processing such as charging, usage control, and quality of service control is performed on the data packet in the area 2, to enhance a user data management capability of a core network.

In a possible design, the first SMF network element sends third rule information to a second anchor UPF network element managed by the first SMF network element, where the third rule information is used to indicate a processing method to be performed by the second anchor UPF network element on a downlink data packet of a second application, and where the downlink data packet of the second application is transmitted sequentially through the second anchor UPF network element and the branching point.

In a possible design, the second information further includes first indication information, where the first indication information is used to indicate the second SMF network element to request the branching point to report packet loss information. Additionally, the packet loss information includes one or more of a quantity of discarded downlink data packets of the first application or a quantity of discarded downlink data packets of the second application, and the downlink data packet of the second application is transmitted sequentially through the second anchor UPF network element and the branching point. In this way, the first SMF network element can determine an actual quantity of downlink data packets of the first application and/or the second application based on the packet loss information received from the branching point and a quantity, obtained through statistics collection by the first anchor UPF network element, of downlink data packets of the first application and/or a quantity, obtained through statistics collection by the second anchor UPF network element, of downlink data packets of the second application. This ensures accuracy of a processing method to be performed on the downlink data packet of the first application and/or the second application.

In a possible design, the second information further includes second rule information, where the second rule information is used to indicate a processing method to be performed by the branching point on a data packet of the second application, and where the data packet of the second application is transmitted through a second anchor UPF network element managed by the first SMF network element and the branching point.

In a possible design, the second information further includes second identifier information, and the second identifier information is used to identify the data packet of the second application. Additionally, the method further includes: sending, by the first SMF network element, second indication information to the second anchor UPF network element, where the second indication information is used to indicate the second anchor UPF network element to carry the second identifier information in the downlink data packet of the second application when the second anchor UPF network element sends the downlink data packet. In this way, when the downlink data packet of the second application belongs to a service data flow (SDF) to be identified through deep packet inspection, the second anchor UPF network element carries the second identifier information in the downlink data packet of the second application when sending the downlink data packet. As such, the branching point can identify the downlink data packet of the second application based on the second identifier information, and can perform a processing method on the downlink data packet of the second application.

In a possible design, the second information further includes first identifier information and third indication information, where the first identifier information is used to identify the data packet of the first application, and where the third indication information is used to indicate the second SMF network element to request the first anchor UPF network element to carry the first identifier information in the downlink data packet of the first application when the first anchor UPF network element sends the downlink data packet. In this way, when the downlink data packet of the first application belongs to an SDF to be identified through deep packet inspection, the first anchor UPF network element carries the first identifier information in the downlink data packet of the first application when sending the downlink data packet. As such, the branching point can identify the downlink data packet of the first application based on the first identifier information, and can perform a processing method on the downlink data packet of the first application.

In a possible design, the first SMF network element sends second indication information to the second anchor UPF network element, where the second indication information may be further used to indicate the second anchor UPF network element to delete third rule information, and where the third rule information is used to indicate a processing method to be performed by the second anchor UPF network element on the downlink data packet of the second application. This can save storage space of the second anchor UPF network element.

In a possible design, the first rule information is further used to indicate that the first network element processing the data packet of the first application is the branching point.

In a possible design, the second information further includes fifth indication information, and the fifth indication information is used to indicate the first network element processing the data packet of the first application.

In a possible design, the fifth indication information is the first information.

According to another aspect, this application further discloses a policy management method, where the method includes: sending, by a second SMF network element, first information to a first SMF network element, where the first information is used to indicate a data network to which a first anchor UPF network element managed by the second SMF network element is connected, where the first information is used to determine first rule information to be executed by a first network element managed by the second SMF network element, where the first network element includes at least one of the first anchor UPF network element or a branching point, where the branching point is a UPF network element having a traffic offload function, where the branching point is connected to the first anchor UPF network element, where the first rule information is used to indicate a processing method to be performed on a data packet of a first application, and where the data packet of the first application is transmitted through the first anchor UPF network element; and receiving, by the second SMF network element, second information from the first SMF network element, where the second information includes the first rule information.

According to the foregoing method, in a scenario shown in FIG. 1, when a data packet in an area 2 is transmitted not through a second anchor UPF network element in an area 1, at least one of a first anchor UPF network element or a branching point in the area 2 may perform a processing method on the data packet in the area 2. Processing such as charging, usage control, and quality of service control is performed on the data packet in the area 2, to enhance a user data management capability of a core network.

In a possible design, the second information further includes first indication information, where the first indication information is used to indicate the second SMF network element to request the branching point to report packet loss information, where the packet loss information includes one or more of a quantity of discarded downlink data packets of the first application or a quantity of discarded downlink data packets of a second application, and where a downlink data packet of the second application is transmitted sequentially through a second anchor UPF (A-UPF) network element managed by the first SMF network element and the branching point. The method further includes: sending, by the second SMF network element, request information to the branching point based on the first indication information, where the request information is used to request the branching point to report the packet loss information. In this way, the first SMF network element can determine an actual quantity of downlink data packets of the first application and/or the second application based on the packet loss information received from the branching point and a quantity, obtained through statistics collection by the first anchor UPF network element, of downlink data packets of the first application and/or a quantity, obtained through statistics collection by the second anchor UPF network element, of downlink data packets of the second application. This ensures accuracy of a processing method to be performed on the downlink data packet of the first application and/or the second application.

In a possible design, the second information further includes second rule information, where the second rule information is used to indicate a processing method to be performed by the branching point on a data packet of a second application, and where the data packet of the second application is transmitted through a second anchor UPF network element managed by the first SMF network element. The method further includes: sending, by the second SMF network element, fourth rule information to the branching point based on the second rule information, where the fourth rule information is used to indicate the processing method to be performed by the branching point on the data packet of the second application.

In a possible design, the second information further includes second identifier information, and the second identifier information is used to identify the data packet of the second application. The method further includes: sending, by the second SMF network element, the second identifier information to the branching point. In this way, when the downlink data packet of the second application belongs to an SDF to be identified through deep packet inspection, the second anchor UPF network element carries the second identifier information in the downlink data packet of the second application when sending the downlink data packet. As such, the branching point can identify the downlink data packet of the second application based on the second identifier information, and can perform a processing method on the downlink data packet of the second application.

In a possible design, the second information further includes first identifier information and third indication information, where the first identifier information is used to identify the data packet of the first application, and where the third indication information is used to indicate the second SMF network element to request the first anchor UPF network element to carry the first identifier information in the downlink data packet of the first application when the first anchor UPF network element sends the downlink data packet. Correspondingly, the second SMF network element requests, based on the received third indication information, the first anchor UPF network element to carry the first identifier information in the downlink data packet of the first application when the first anchor UPF network element sends the downlink data packet. In this way, when the downlink data packet of the first application belongs to an SDF to be identified through deep packet inspection, the first anchor UPF network element carries the first identifier information in the downlink data packet of the first application when sending the downlink data packet. As such, the branching point can identify the downlink data packet of the first application based on the first identifier information, and can perform a processing method on the downlink data packet of the first application.

In a possible design, the first rule information is further used to indicate that the first network element processing the data packet of the first application is the branching point.

In a possible design, the second information further includes fifth indication information, and the fifth indication information is used to indicate the first network element processing the data packet of the first application.

In a possible design, the fifth indication information is the first information.

According to another aspect, this application further discloses a policy management method, where the method includes: receiving, by a branching point, indication information from a second SMF network element, where the branching point is a UPF network element having a traffic offload function; and sending, by the branching point, packet loss information to the second SMF network element based on the indication information, where the packet loss information includes one or more of the following: a quantity of discarded downlink data packets of a first application or a quantity of discarded downlink data packets of a second application, where a downlink data packet of the first application is transmitted sequentially through a first anchor UPF network element and the branching point that are managed by the second SMF network element, and where a downlink data packet of the second application is transmitted sequentially through a second anchor UPF network element managed by a first SMF network element and the branching point.

According to the foregoing method, the first SMF network element can determine an actual quantity of downlink data packets of the first application and/or the second application based on the packet loss information received from the branching point and a quantity, obtained through statistics collection by the first anchor UPF network element, of downlink data packets of the first application and/or a quantity, obtained through statistics collection by the second anchor UPF network element, of downlink data packets of the second application. This ensures accuracy of a processing method to be performed on the downlink data packet of the first application and/or the second application.

According to another aspect, this application further discloses a policy management method, where the method includes: receiving, by a first SMF network element, ninth information from a second SMF network element, where the ninth information is used to indicate that the second SMF network element has inserted a branching point, and where the branching point is a UPF network element that is managed by the second SMF network element and that has a traffic offload function; and sending, by the first SMF network element, second information to the second SMF network element, where the second information includes first rule information and second rule information, where the first rule information is used to indicate a processing method to be performed by the branching point on a data packet of a first application, where the second rule information is used to indicate a processing method to be performed by the branching point on a data packet of a second application, where the data packet of the second application is transmitted through a second anchor UPF network element managed by the first SMF network element and the branching point, and where the data packet of the first application is transmitted through a first anchor UPF network element and the branching point that are managed by the second SMF network element.

According to the foregoing method, in a scenario shown in FIG. 1, when a data packet in an area 2 is transmitted not through a second anchor UPF network element in an area 1, a branching point in the area 1 may perform processing methods on an uplink data packet and a downlink data packet in the area 2. Processing such as charging, usage control, and quality of service control is performed on the data packet in the area 2, to enhance a user data management capability of a core network.

In a possible design, the second information further includes second identifier information, and the second identifier information is used to identify the data packet of the second application. The method further includes: sending, by the first SMF network element, second indication information to the second anchor UPF network element, where the second indication information is used to indicate the second anchor UPF network element to carry the second identifier information in a downlink data packet of the second application when the second anchor UPF network element sends the downlink data packet. In this way, the branching point performs a processing method on the downlink data packet of the second application. When the downlink data packet of the second application belongs to an SDF to be identified through deep packet inspection, the second anchor UPF network element carries the second identifier information in the downlink data packet of the second application when sending the downlink data packet. In this way, the branching point can identify the downlink data packet of the second application based on the second identifier information, and can perform the processing method on the downlink data packet of the second application.

In a possible design, the second information further includes first identifier information and third indication information, where the first identifier information is used to identify the data packet of the first application, and where the third indication information is used to indicate the second SMF network element to request the first anchor UPF network element to carry the first identifier information in a downlink data packet of the first application when the first anchor UPF network element sends the downlink data packet. In this way, the branching point performs a processing method on the downlink data packet of the first application. When the downlink data packet of the first application belongs to an SDF to be identified through deep packet inspection, the first anchor UPF network element carries the first identifier information in the downlink data packet of the first application when sending the downlink data packet. In this way, the branching point can identify the downlink data packet of the first application based on the first identifier information, and can perform the processing method on the downlink data packet of the first application.

According to another aspect, this application further discloses a policy management method, where the method includes: sending, by a second SMF network element, first information to a first SMF network element, where the first information is used to indicate that the second SMF network element has inserted a branching point, and where the branching point is a UPF network element that is managed by the second SMF network element and that has a traffic offload function; and receiving, by the second SMF network element, second information from the first SMF network element, where the second information includes first rule information and second rule information, where the first rule information is used to indicate a processing method to be performed by the branching point on a data packet of a first application, where the second rule information is used to indicate a processing method to be performed by the branching point on a data packet of a second application, where the data packet of the second application is transmitted through a second anchor UPF network element managed by the first SMF network element and the branching point, and where the data packet of the first application is transmitted through a first anchor UPF network element and the branching point that are managed by the second SMF network element.

According to the foregoing method, in a scenario shown in FIG. 1, when a data packet in an area 2 is transmitted not through a second anchor UPF network element in an area 1, a branching point in the area 1 may perform processing methods on an uplink data packet and a downlink data packet in the area 2. Processing such as charging, usage control, and quality of service control is performed on the data packet in the area 2, to enhance a user data management capability of a core network.

In a possible design, the second SMF network element sends eleventh information to the branching point based on the first rule information, where the eleventh information is used to indicate the branching point to process the data packet of the first application and the data packet of the second application.

In a possible design, the second information further includes second identifier information, and the second identifier information is used to identify the data packet of the second application. In this way, the branching point performs the processing method on the data packet of the second application. When the data packet of the second application belongs to an SDF to be identified through deep packet inspection, the second anchor UPF network element carries the second identifier information in a downlink data packet of the second application when sending the downlink data packet. In this way, the branching point can identify the data packet of the second application based on the second identifier information, and can perform the processing method on the data packet of the second application.

In a possible design, the second information further includes first identifier information and third indication information, where the first identifier information is used to identify the data packet of the first application, and where the third indication information is used to indicate the second SMF network element to request the first anchor UPF network element to carry the first identifier information in a downlink data packet of the first application when the first anchor UPF network element sends the downlink data packet. Correspondingly, the second SMF network element requests, based on the third indication information, the first anchor UPF network element to carry the first identifier information in the downlink data packet of the first application when the first anchor UPF network element sends the downlink data packet. In this way, the branching point performs the processing method on the data packet of the first application. When the data packet of the first application belongs to an SDF to be identified through deep packet inspection, the first anchor UPF network element carries the first identifier information in the downlink data packet of the first application when sending the downlink data packet. In this way, the branching point can identify the data packet of the first application based on the first identifier information, and can perform the processing method on the data packet of the first application.

According to another aspect, this application further discloses a policy management method, where the method includes: receiving, by a branching point, identifier information (for example, first identifier information and/or second identifier information) of a data packet of an application (for example, a first application and/or a second application) from a first SMF network element via a second SMF network element, where the data packet of the application is transmitted through an anchor UPF network element managed by a third SMF network element, where the branching point is a UPF network element that is managed by the second SMF network element and that has a traffic offload function, and where the branching point is connected to the anchor UPF network element; receiving, by the branching point, a downlink data packet of the application from the anchor UPF network element, where the downlink data packet carries the identifier information; and identifying, by the branching point, the downlink data packet based on the identifier information carried in the downlink data packet, where the first SMF network element is an anchor SMF network element, and where the third SMF network element is one or more of the first SMF network element or the second SMF network element.

According to the foregoing method, when the downlink data packet of the application belongs to an SDF to be identified through deep packet inspection, the anchor UPF network element carries the identifier information in the downlink data packet of the application when sending the downlink data packet. As such, the branching point can identify, based on the identifier information, the downlink data packet corresponding to the application, and can perform a processing method on the downlink data packet of the application.

In a possible design, the branching point sends the downlink data packet and the identifier information to a terminal device. In this way, when sending an uplink data packet of the application, the terminal device may carry the same identifier information in the uplink data packet, such that the branching point identifies, based on the identifier information carried in the uplink data packet, the uplink data packet corresponding to the application, and can perform a processing method on the uplink data packet of the application.

According to another aspect, this application further discloses a policy management method, where the method includes: receiving, by a terminal device, a downlink data packet and identifier information (for example, first identifier information and/or second identifier information) from a branching point, where the identifier information is used to identify a downlink data packet of an application, and where the branching point is a UPF network element having a traffic offload function; and sending, by the terminal device, an uplink data packet of the application to the branching point, where the uplink data packet carries the identifier information.

According to the foregoing method, the branching point performs a processing method on the uplink data packet of the application (for example, a first application and/or a second application). When the uplink data packet of the application belongs to an SDF to be identified through deep packet inspection, the uplink data packet sent by the terminal device to the branching point carries the identifier information, such that the branching point can identify the data packet of the application based on the identifier information, and can perform the processing method on the uplink data packet of the application.

According to another aspect, an embodiment of this application provides a policy management apparatus. The apparatus has a function of implementing a behavior of the first SMF network element in the foregoing method. The function may be implemented by hardware, or may be implemented by hardware by executing corresponding software. The hardware or the software includes one or more modules corresponding to the foregoing function. In a possible design, a structure of the apparatus includes a processor and a transceiver. The processor is configured to make the apparatus to perform a corresponding function in the foregoing method. The transceiver is configured to implement communication between the apparatus and a second SMF network element/a second anchor UPF network element. The apparatus may further include a memory. The memory is configured to be coupled to the processor, and stores a program instruction and data that are necessary for the apparatus.

According to another aspect, an embodiment of this application provides a policy management apparatus. The apparatus has a function of implementing a behavior of the second SMF network element in the foregoing method. The function may be implemented by hardware, or may be implemented by hardware by executing corresponding software. The hardware or the software includes one or more modules corresponding to the foregoing function. In a possible design, a structure of the apparatus includes a processor and a transceiver. The processor is configured to make the apparatus to perform a corresponding function in the foregoing method. The transceiver is configured to implement communication between the apparatus and a first SMF network element/a branching point. The apparatus may further include a memory. The memory is configured to be coupled to the processor, and stores a program instruction and data that are necessary for the apparatus.

According to another aspect, an embodiment of this application provides a policy management apparatus. The apparatus has a function of implementing a behavior of the branching point in the foregoing method. The function may be implemented by hardware, or may be implemented by hardware by executing corresponding software. The hardware or the software includes one or more modules corresponding to the foregoing function. In a possible design, a structure of the apparatus includes a processor and a transceiver. The processor is configured to make the apparatus to perform a corresponding function in the foregoing method. The transceiver is configured to implement communication between the apparatus and a second SMF network element/a first SMF network element/a first anchor UPF network element/a terminal device. The apparatus may further include a memory. The memory is configured to be coupled to the processor, and stores a program instruction and data that are necessary for the apparatus.

According to another aspect, an embodiment of this application provides a terminal device. The terminal device has a function of implementing a behavior of the terminal device in the foregoing method. The function may be implemented by hardware, or may be implemented by hardware by executing corresponding software. The hardware or the software includes one or more modules corresponding to the foregoing function. In a possible design, a structure of the terminal device includes a processor and a transceiver. The processor is configured to make the terminal device to perform a corresponding function in the foregoing method. The transceiver is configured to implement communication between the terminal device and a branching point. The terminal device may further include a memory. The memory is configured to be coupled to the processor, and stores a program instruction and data that are necessary for the terminal device.

According to another aspect, an embodiment of this application provides a computer-readable storage medium. The computer-readable storage medium stores an instruction. When the instruction is run on a computer, the computer is enabled to perform the methods in the foregoing aspects.

According to another aspect, an embodiment of this application provides a computer program product including an instruction. When the computer program product runs on a computer, the computer is enabled to perform the methods in the foregoing aspects.

According to another aspect, this application provides a chip system. The chip system includes a processor configured to support the foregoing apparatus or terminal device to implement a function in the foregoing aspects, for example, generate or process information in the foregoing methods. In a possible design, the chip system further includes a memory, and the memory is configured to store a program instruction and data that are necessary for a data sending device. The chip system may include a chip, or may include a chip and another discrete component.

BRIEF DESCRIPTION OF DRAWINGS

To describe the technical solutions in the embodiments of this application more clearly, the following describes the accompanying drawings required for description in the embodiments of this application or the background.

DESCRIPTION OF EMBODIMENTS

The following clearly describes the technical solutions in the embodiments of this application with reference to the accompanying drawings in the embodiments of this application. "A plurality of" in this application refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
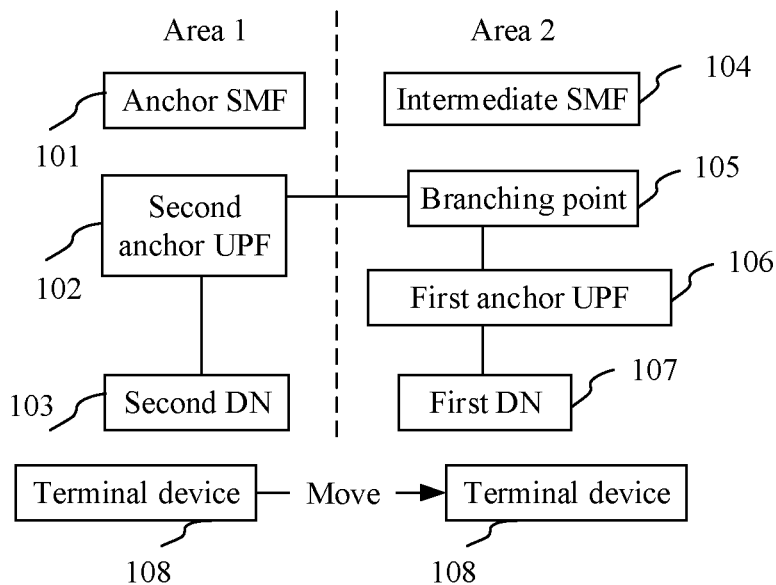
FIG. 1 is a schematic scenario diagram of policy management according to an embodiment of this application.

FIG. 1 is a schematic scenario diagram of policy management according to an embodiment of this application. As shown in FIG. 1, a terminal device 108 is located in an area 1 before moving, and establishes a user plane path in the area 1. In this case, the terminal device 108 accesses a second DN 103 via a second anchor UPF network element 102. The second anchor UPF network element 102 is managed by an anchor SMF network element 101.

When the terminal device 108 moves from the area 1 to an area 2, because the terminal device 108 is not located in a service area of the anchor SMF network element 101, in other words, moves out of the service area of the anchor SMF network element 101, an intermediate SMF network element 104 is inserted in a core network in the area 2, to serve the terminal device 108. The intermediate SMF network element 104 inserts a branching point 105 and a first anchor UPF network element 106 in the area 2. The intermediate SMF network element 104 is configured to manage the branching point 105 and the first anchor UPF network element 106. The branching point 105 is configured to perform traffic offload for a session established by the terminal device, such that the terminal device 108 establishes two user plane paths in the area 2. (1) The terminal device 108 accesses a first DN 107 sequentially through the branching point 105 and the first anchor UPF network element 106. (2) The terminal device 108 accesses the second DN 103 sequentially through the branching point 105 and the second anchor UPF network element 102.

It should be noted that if there are N (where N is an integer greater than 1) first DNs in the area 2, the intermediate SMF network element 104 inserts N first anchor UPF network elements that each are connected to the N first DNs.

In the scenario shown in FIG. 1, the first DN 107 falls within the area 2, and a data packet of a first application supported by the first DN 107 is transmitted through the first anchor UPF network element 106 and the branching point 105. Therefore, a processing method can be performed on a data packet in the area 1 by one or more of the first anchor UPF network element 106 and the branching point 105. The second DN 103 falls within the area 1, and a data packet of a second application supported by the second DN 103 is transmitted through the second anchor UPF network element 102 and the branching point 105. Therefore, a processing method can be performed on a data packet in the area 2 by one or more of the second anchor UPF network element 102 and the branching point 105.

The schematic scenario diagram shown in FIG. 1 is applicable to a 5G communications system. In a 5G mobile network architecture, a control plane function of a mobile gateway is decoupled from a forwarding plane function of the mobile gateway, and the separated control plane function of the mobile gateway, a conventional 3rd Generation Partnership Project (3GPP) control network element mobility management entity (MME), and the like are combined to constitute a unified control plane. A UPF network element can implement user plane functions (an SGW-U and a PGW-U) of a serving gateway (SGW) and a packet data network gateway (PGW). Further, a unified control plane network element may be separated into an access and mobility management function (AMF) network element and an SMF network element.

As shown in FIG. 1, the communications system provided in this embodiment of this application includes at least the anchor SMF network element 101, the second anchor UPF network element 102, the second DN 103, the intermediate SMF network element 104, the branching point 105, the first anchor UPF network element 106, the first DN 107, and the terminal device 108.

The terminal device 108 in the system includes but is not limited to a mobile phone, an internet of things device, a smart home device, an industrial control device, a vehicle device, or the like in a 5G network. The terminal device may also be referred to as a user equipment (UE), a mobile station, a mobile console, a remote station, a remote terminal, an access terminal, a terminal device, user terminal, or a user agent. This is not limited herein. The terminal device may alternatively be a vehicle in vehicle-to-vehicle (V2V) communication, a machine in machine type communication (MTC), or the like.

The second anchor UPF network element 102 and the first anchor UPF network element 106 in the system are UPF network elements used as Internet Protocol (IP) anchors of the terminal device in a packet data unit (PDU) session. The first anchor UPF network element 106 may also be referred to as a first anchor UPF device or a first anchor UPF entity. The second anchor UPF network element 102 may also be referred to as a second anchor UPF device or a second anchor UPF entity.

The branching point 105 in the system is a UPF network element having the following functions: sending uplink data to different anchor UPF network elements, and aggregating downlink data from the different anchor UPF network elements. The branching point includes a branching point (BP) UPF network element in a multi-homed PDU session scenario or a UPF network element implementing an uplink (UL) classifier (ULCL).

It should be noted that the branching point 105 and the first anchor UPF network element 106 in the system may be one integrated network element, or may be two independent network elements. This is not limited in this embodiment of this application.

The intermediate SMF network element 104 and the anchor SMF network element 101 in the system may be responsible for session management for the terminal device 108. For example, the session management includes selection of a user plane device, reselection of a user plane device, IP address allocation, quality of service (QOS) control, session establishment, modification, or release, and the like.

The first DN 107 and the second DN 103 in the system may be services provided by an operator, internet access services, or services provided by a third party. The first DN 107 and the second DN 103 may be a same DN, but the first DN 107 and the second DN 103 are deployed at different locations.

Optionally, the 5G communications system further includes a radio access network (RAN) device. The RAN device is an apparatus configured to provide a wireless communication function for the terminal device 108. The RAN device may include base stations in various forms, such as a macro base station, a micro base station (also referred to as a small cell), a relay station, and an access point. In systems that use different radio access technologies, names of a device that has a base station function may be different. For example, in a Long-Term Evolution (LTE) system, the device is referred to as an evolved NodeB (eNB or eNodeB). In a 3rd generation (3G) system, the device is referred to as a NodeB. In a new generation system, the device is referred to as a gNB or gNodeB. The RAN device may alternatively be a device that supports non-3GPP access, for example, a non-3GPP Interworking function (N3IWF) device that supports Wi-Fi access. Optionally, the 5G communications system further includes an AMF network element. For example, the AMF network element may be responsible for registration, mobility management, and a tracking area update procedure for the terminal device. The AMF network element may also be referred to as an AMF device or an AMF entity.

Optionally, the 5G communications system further includes a policy control function (PCF) network element. The network element includes a policy control function and a flow-based charging control function. For example, the PCF network element may implement a user subscription data management function, a policy control function, a charging policy control function, and QoS control. The PCF network element may also be referred to as a PCF entity or a PCF device.

The foregoing network elements may be network elements implemented on dedicated hardware, or may be software instances run on dedicated hardware, or may be instances of virtualization functions on a proper platform. For example, the foregoing virtualization platform may be a cloud platform.

In addition, this embodiment of this application may also be applicable to other future-oriented communications technologies. The network architecture and the service scenario described in this application are intended to describe the technical solutions in this application more clearly, and do not constitute a limitation on the technical solutions provided in this application. A person of ordinary skill in the art may know that: With the evolution of the network architecture and the emergence of new service scenarios, the technical solutions provided in this application are also applicable to similar technical problems.

The following uses the scenario described in FIG. 1 as an example to describe the technical solutions in this application in detail using some embodiments. The following several embodiments may be combined with each other, and a same or similar concept or process may not be described repeatedly in some embodiments.

Figure 2:
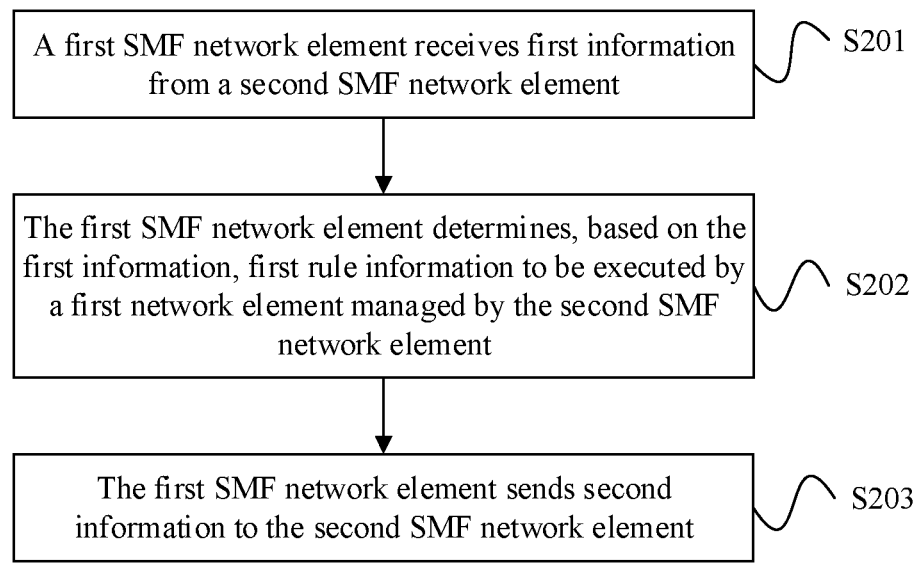
FIG. 2 shows a policy management method according to an embodiment of this application.

FIG. 2 shows a method according to an embodiment of this application. The method may be applied to the scenario described in FIG. 1. According to the method, a network element in the area 2 can implement a processing method on a data packet in the area 2. As shown in FIG. 2, the method may include the following steps.

S201: A first SMF network element receives first information from a second SMF network element. The first information is used to indicate a data network to which a first anchor UPF network element managed by the second SMF network element is connected.

For example, the first SMF network element is the anchor SMF network element 101 in FIG. 1, the second SMF network element is the intermediate SMF network element 104 in FIG. 1, the first anchor UPF network element is the first anchor UPF network element 106 in FIG. 1, and the data network to which the first anchor UPF network element is connected is the first DN 107 in FIG. 1.

For example, the first information is a data network access identifier (DNAI), and the first information is used to indicate an access identifier of the first DN to which the first anchor UPF network element managed by the intermediate SMF network element is connected.

Optionally, if the intermediate SMF network element manages N (where N is an integer greater than 1) first anchor UPF network elements, and the N first anchor UPF network elements each are connected to N data networks, the first information is used to indicate the N data networks to which each of the N first anchor UPF network elements is connected.

S202: The first SMF network element determines, based on the first information, first rule information to be executed by a first network element managed by the second SMF network element, where the first network element includes at least one of the first anchor UPF network element or a branching point, where the branching point is a UPF network element having a traffic offload function, where the branching point is connected to the first anchor UPF network element, where the first rule information is used to indicate a processing method to be performed on a data packet of a first application, and where the data packet of the first application is transmitted through the first anchor UPF network element.

For example, the branching point is the branching point 105 in FIG. 1. The first network element includes at least one of the first anchor UPF network element 106 or the branching point 105 in FIG. 1. The first application is an application supported by the first DN 107 in FIG. 1, and the data packet of the first application is transmitted through the first anchor UPF network element 106.

For example, the first rule information may be a policy and charging control (PCC) rule.

For example, the first information is the DNAI. If the first rule information includes the DNAI in the first information, the first SMF network element determines that a data packet corresponding to the PCC rule is transmitted through the first anchor UPF and the branching point. Therefore, the first SMF network element determines, based on the first information, that at least one of the first anchor UPF network element or the branching point executes the PCC rule.

It should be noted that the data packet of the first application includes any one of the following: an uplink data packet of the first application, a downlink data packet of the first application, or an uplink data packet and a downlink data packet of the first application.

Correspondingly, the first network element executes the first rule information in any one of the following four manners.

(1) The first anchor UPF network element performs a processing method on the uplink data packet of the first application, and the branching point performs a processing method on the downlink data packet of the first application.

(2) The first anchor UPF network element performs processing methods on the uplink data packet and the downlink data packet of the first application.

(3) The branching point performs a processing method on the uplink data packet of the first application, and the first anchor UPF network element performs a processing method on the downlink data packet of the first application.

(4) The branching point performs processing methods on the uplink data packet and the downlink data packet of the first application.

S203: The first SMF network element sends second information to the second SMF network element, where the second information includes the first rule information.

Optionally, the second information further includes indication information (that is, fifth indication information) of the first network element. In this case, the indication information of the first network element is used to indicate whether the first network element is the branching point or the first anchor UPF network element. In other words, the indication information of the first network element is used to indicate whether a network element that is to execute the first rule information is the branching point or the first anchor UPF network element. For example, the fifth indication information may be the first information in step S201.

Optionally, the second information does not include the fifth indication information. In this case, the first rule information in the second information is used to indicate that a network element that is to execute the first rule information is the branching point.

Optionally, the first SMF network element may further indicate, to the second SMF network element through the second information, whether the first network element is the branching point or the first anchor UPF network element. In a possible implementation, when the second information includes the fifth indication information, the first network element is the first anchor UPF network element; or when the second information does not include the fifth indication information, the first network element is the branching point. For example, the fifth indication information may be the DNAI obtained in step S201.

According to the method in this embodiment of this application, in the scenario shown in FIG. 1, when a data packet in the area 2 is transmitted not through the second anchor UPF network element in the area 1, at least one of the first anchor UPF network element or the branching point in the area 2 may perform a processing method on the data packet in the area 2. Processing such as charging, usage control, and quality of service control is performed on the data packet in the area 2, to enhance a user data management capability of a core network.

Optionally, for the four manners in which the first network element executes the first rule information, where the first SMF network element determines in step S202 that the first network element executes the first rule information, the second information further includes the following content.

In the implementation (1), the branching point performs the processing method on the downlink data packet of the first application. If the downlink data packet of the first application belongs to a service data flow (SDF) that requires deep packet inspection, when the branching point identifies the downlink data packet of the first application, the branching point may depend on a previous downlink data packet of the downlink data packet. Correspondingly, the first rule information is used to indicate a processing method to be performed by the branching point on the data packet of the first application, and the second information further includes first identifier information and third indication information. The first identifier information is used to identify the data packet of the first application, and the third indication information is used to indicate the second SMF network element (for example, the intermediate SMF network element) to request the first anchor UPF network element to carry the first identifier information in the downlink data packet of the first application when the first anchor UPF network element sends the downlink data packet. In this way, even if the branching point is inserted after a PDU session is established, the branching point can learn, based on the first identifier information carried in the downlink data packet, that the downlink data packet is the downlink data packet of the first application, and properly process the processing method on the downlink data packet of the first application.

For example, the first identifier information includes an SDF label. A format of the SDF label is not limited in this embodiment. For example, the SDF label may be a field in a General Packet Radio Service (GPRS) Tunneling Protocol (GTP) header, or an encapsulation added between a GTP header and an IP header and used to carry an SDF label, or in another format.

According to the method in the implementation (1), when the downlink data packet of the first application belongs to the SDF to be identified through deep packet inspection, the first anchor UPF network element carries the first identifier information in the downlink data packet of the first application when sending the downlink data packet. As such, the branching point can identify the downlink data packet of the first application based on the first identifier information, and can perform the processing method on the downlink data packet of the first application.

In the implementation (2), the downlink data packet of the first application is transmitted sequentially through the first anchor UPF network element and the branching point, and the branching point may discard a data packet when controlling a session aggregate maximum bit rate (AMBR). In this case, the second information further includes first indication information, where the first indication information is used to indicate the second SMF network element (for example, the intermediate SMF network element) to request the branching point to report packet loss information, and where the packet loss information includes a quantity of discarded downlink data packets of the first application. For example, the quantity of discarded downlink data packets of the first application may be a quantity of bytes or a quantity of packets. In this way, even if the branching point may discard a data packet, the first SMF network element (for example, the anchor SMF network element) can determine an actual quantity of downlink data packets of the first application based on the packet loss information reported by the branching point and a quantity, received from the first anchor UPF network element, of downlink data packets of the first application. This ensures accuracy of the processing method to be performed by the first anchor UPF network element on the downlink data packet of the first application.

For example, the first SMF network element (for example, the anchor SMF network element) receives the packet loss information from the branching point via the second SMF network element (for example, the intermediate SMF network element), the first SMF network element receives the quantity of downlink data packets of the first application from the first anchor UPF network element via the second SMF network element (for example, the intermediate SMF network element), and then the first SMF network element subtracts the quantity of discarded downlink data packets in the packet loss information from the quantity of downlink data packets of the first application, to determine the actual quantity of downlink data packets of the first application.

According to the method in the implementation (2), when the first anchor UPF network element performs the processing method on the downlink data packet of the first application, the first SMF network element can determine the actual quantity of downlink data packets of the first application based on the packet loss information received from the branching point and the quantity, received from the first anchor UPF network element, of downlink data packets of the first application. This ensures accuracy of the processing method to be performed by the first anchor UPF network element on the downlink data packet of the first application.

In the implementation (2), the second information further includes first identifier information and third indication information. The first identifier information is used to identify the data packet of the first application, and the third indication information is used to indicate the second SMF network element (for example, the intermediate SMF network element) to request the first anchor UPF network element to carry the first identifier information in the downlink data packet of the first application when the first anchor UPF network element sends the downlink data packet. When the downlink data packet of the first application belongs to an SDF to be identified through deep packet inspection, the first anchor UPF network element carries the first identifier information in the downlink data packet of the first application when sending the downlink data packet, such that the branching point can identify the downlink data packet of the first application based on the first identifier information, and can collect statistics on discarded data packets of the first application.

In the implementation (3), when the branching point performs the processing method on the uplink data packet of the first application, as described in the implementation (1), if the uplink data packet of the first application belongs to an SDF to be identified through deep packet inspection, the second information further includes first identifier information and third indication information. The second SMF network element (for example, the intermediate SMF network element) requests, based on the third indication information, the first anchor UPF network element to carry the first identifier information in the downlink data packet of the first application when the first anchor UPF network element sends the downlink data packet. When receiving the downlink data packet of the first application, a terminal device receives the first identifier information, and the terminal device carries the first identifier information in the uplink data packet of the first application when sending the uplink data packet to the branching point. In this way, the branching point can identify the uplink data packet of the first application.

In the implementation (3), when the first anchor UPF network element performs the processing method on the downlink data packet of the first application, as described in the implementation (2), the second information further includes first indication information, and the first indication information is used to indicate the second SMF network element (for example, the intermediate SMF network element) to request the branching point to report packet loss information. In this way, even if the branching point may discard a data packet, the first SMF network element (for example, the anchor SMF network element) can determine an actual quantity of downlink data packets of the first application based on the packet loss information reported by the branching point and a quantity, received from the first anchor UPF network element, of downlink data packets of the first application. This ensures accuracy of the processing method to be performed by the first anchor UPF network element on the downlink data packet of the first application.

According to the method in the implementation (3), if the uplink data packet of the first application belongs to the SDF to be identified through deep packet inspection, the branching point can identify the uplink data packet of the first application based on the first identifier information, and can perform the processing method on the uplink data packet of the first application. When the first anchor UPF network element performs the processing method on the downlink data packet of the first application, the first SMF network element can determine the actual quantity of downlink data packets of the first application based on the packet loss information received from the branching point and the quantity, received from the first anchor UPF network element, of downlink data packets of the first application. This ensures accuracy of the processing method to be performed by the first anchor UPF network element on the downlink data packet of the first application.

In the implementation (4), when the branching point performs the processing methods on the uplink data packet and the downlink data packet of the first application, as described in the implementation (1) and the implementation (3), if the uplink data packet and the downlink data packet of the first application belong to SDFs that require deep packet inspection, the second information further includes first identifier information and third indication information.

According to the method in the implementation (4), if the uplink data packet and the downlink data packet of the first application belong to the SDFs that require deep packet inspection, the branching point can identify the uplink data packet and the downlink data packet of the first application based on the first identifier information, and can perform the processing methods on the uplink data packet and the downlink data packet of the first application.

Implementation processes of the foregoing implementations (1), (2), and (4) may be further described with reference to FIG. 3, FIG. 4, and FIG. 5, respectively.

Figure 3:
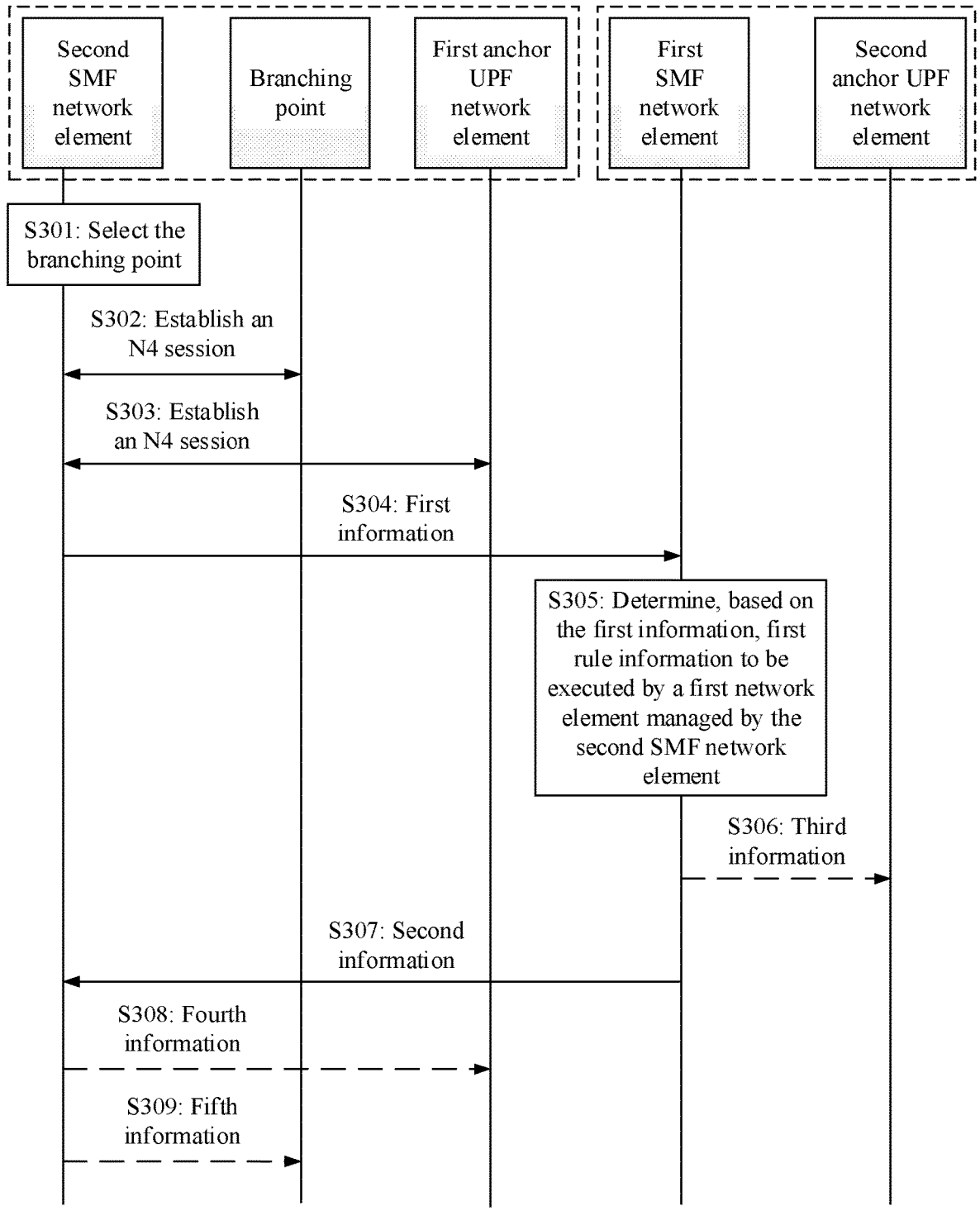
FIG. 3 is a flowchart of another policy management method according to an embodiment of this application.

FIG. 3 is a flowchart of a policy management method according to an embodiment of this application. The method shown in FIG. 3 is used to describe the implementation (1), applicable to the scenario described in FIG. 1, in step S202 in FIG. 2. To be more specific, a first SMF network element determines, based on first information, that a first anchor UPF network element performs a processing method on an uplink data packet of a first application and a branching point performs a processing method on a downlink data packet of the first application. FIG. 3 provides a description with reference to FIG. 1 and FIG. 2. As shown in FIG. 3, the method may include the following steps.

S301: A second SMF network element selects the branching point.

For example, the second SMF network element is the intermediate SMF network element 104 in FIG. 1, and the branching point is the branching point 105 in FIG. 1.

For a process in which the second SMF network element selects the branching point, refer to the description in FIG. 1. Details are not described herein again.

For example, the first anchor UPF network element and the branching point may be one integrated network element, or may be two different network elements. When the first anchor UPF network element and the branching point are two different network elements, the branching point is connected to both the first anchor UPF network element and a second anchor UPF network element.

S302: The second SMF network element establishes an N4 session with the branching point.

For example, the second SMF network element sends an N4 session establishment request to the branching point, and the branching point sends an N4 session establishment response to the second SMF network element. In this way, a user plane tunnel from the branching point to the first anchor UPF network element and a user plane tunnel from the branching point to the second anchor UPF network element are established.

S303: The second SMF network element establishes an N4 session with the first anchor UPF network element.

For example, the first anchor UPF network element is the first anchor UPF network element 106 in FIG. 1.

For example, the second SMF network element sends an N4 session establishment request message to the first anchor UPF network element, and the first anchor UPF network element sends an N4 session establishment response to the second SMF network element. In this way, a user plane tunnel from the first anchor UPF network element to the branching point is established.

It should be noted that step S303 may alternatively be performed before step S302.

S304: The second SMF network element sends the first information to the first SMF network element, and correspondingly, the first SMF network element receives the first information from the second SMF network element.

For example, the first SMF network element is the anchor SMF network element 101 in FIG. 1.

For content of the first information, refer to the description of the first information in step S201 in FIG. 2. Details are not described herein again.

For example, the second SMF network element sends the first information to the first SMF network element through a session update request message. The session update request message is further used to request to establish a user plane tunnel from the second anchor UPF network element to the branching point.

S305: The first SMF network element determines, based on the first information, first rule information to be executed by a first network element managed by the second SMF network element.

As described in the implementation (1) in step S202 in FIG. 2, the first SMF network element determines, based on the first information, that the first anchor UPF network element performs the processing method on the uplink data packet of the first application and the branching point performs the processing method on the downlink data packet of the first application.

For example, the first rule information may be a PCC rule.

For example, the first information is a DNAI. If the first rule information includes the DNAI in the first information, the first SMF network element determines that a data packet corresponding to the PCC rule is transmitted through the first anchor UPF and the branching point. Therefore, the first SMF network element determines, based on the first information, that the first anchor UPF network element performs the processing method on the uplink data packet of the first application and the branching point performs the processing method on the downlink data packet of the first application.

S307: The first SMF network element sends second information to the second SMF network element, and correspondingly, the second SMF network element receives the second information from the first SMF network element, where the second information includes the first rule information.

For example, the first SMF network element sends the second information to the second SMF network element through a session update response message.

It should be noted that a format of a message carrying the second information is not limited in this embodiment. For example, the message format may be a PCC rule format, an N4-interface-based message format (for example, a packet detection rule (PDR)) generated according to the PCC rule, or another format.

Optionally, the second information further includes one or more of the following types of information.

A first type of information is data packet identifier information, for example, an SDF label, a 5-tuple, or an application identifier.

A second type of information is information about an operation, for example, charging, usage monitoring, or QoS control.

A third type of information is parameter information, for example, a charging key, a usage monitoring key, or a QoS parameter.

A fourth type of information: If the second SMF network element manages N (where N is an integer greater than 1) first anchor UPF network elements, and the N first anchor UPF network elements each are connected to N data networks, the first information is used to indicate the N data networks to which each of the N first anchor UPF network elements is connected. Each first anchor UPF network element can process only a data packet transmitted through the first anchor UPF network element. To send a data packet processing rule to a corresponding first anchor UPF, when the first rule information is used to indicate the processing method to be performed by the first anchor UPF network element on the uplink data packet of the first application, the first rule information includes a processing rule for a data packet that passes through each first anchor UPF network element and a DNAI corresponding to the first anchor UPF network element.

Optionally, because the first rule information is used to indicate the processing method to be performed by the branching point on the downlink data packet of the first application, the first rule information may not include the DNAI corresponding to the first rule information.

Optionally, as described in FIG. 2, for the implementation (1) in step S202, when the downlink data packet of the first application belongs to an SDF to be identified through deep packet inspection, the second information further includes first identifier information and third indication information. For example, for content of the second information, refer to the description of the second information in the implementation (1) in the optional step of step S202 in FIG. 2. Details are not described herein again.

Optionally, the second information further includes second rule information, where the second rule information is used to indicate a processing method to be performed by the branching point on a downlink data packet of a second application, and where a data packet of the second application is transmitted through the second anchor UPF network element managed by the first SMF network element and the branching point.

For example, the second anchor UPF network element is the second anchor UPF network element 102 in FIG. 1.

For example, the second anchor UPF network element performs a processing method on an uplink data packet of the second application, and the branching point performs the processing method on the downlink data packet of the second application. For details about a case in which the downlink data packet of the second application belongs to an SDF to be identified through deep packet inspection, refer to the description of the case, in the implementation (1) in the optional step of step S202 in FIG. 2, in which the downlink data packet of the first application belongs to the SDF to be identified through deep packet inspection. The second information further includes second identifier information, and the second identifier information is used to identify the data packet of the second application. The first SMF network element sends second indication information to the second anchor UPF network element. The second indication information is used to indicate the second anchor UPF network element to carry the second identifier information in the downlink data packet of the second application when the second anchor UPF network element sends the downlink data packet.

For example, the second identifier information includes an SDF label. A format of the SDF label is not limited in this embodiment. For example, the SDF label may be a field in a GPRS tunneling protocol header, or an encapsulation added between a GTP header and an IP header and used to carry an SDF label, or in another format.

According to the method, when the downlink data packet of the second application belongs to the SDF to be identified through deep packet inspection, the second anchor UPF network element carries the second identifier information in the downlink data packet of the second application when sending the downlink data packet. As such, the branching point can identify the downlink data packet of the second application based on the second identifier information, and can perform the processing method on the downlink data packet of the second application.

According to the method in this embodiment of this application, in the scenario shown in FIG. 1, when a data packet in the area 2 is transmitted not through the second anchor UPF network element in the area 1, the first anchor UPF network element in the area 2 may perform the processing method on the uplink data packet of the first application, and the branching point in the area 2 may perform the processing method on the downlink data packet of the first application. Processing such as charging, usage control, and quality of service control is performed on the data packet in the area 2, to enhance a user data management capability of a core network.

Optionally, after step S305, the method further includes step S306.

S306: The first SMF network element sends third information to the second anchor UPF network element. Correspondingly, the second anchor UPF network element receives the third information from the first SMF network element, where the third information is used to indicate the processing method to be performed by the second anchor UPF network element on the uplink data packet of the second application.

The third information further includes tunnel information of the branching point, and the tunnel information of the branching point is used to establish a tunnel from the second anchor UPF network element to the branching point.

For example, the third information may be N4-interface-based rule information formulated according to the PCC rule, for example, a PDR.

For example, according to the description in step S307, when the second information further includes the second rule information, the second anchor UPF network element performs the processing method on the uplink data packet of the second application, and the branching point performs the processing method on the downlink data packet of the second application. The second anchor UPF network element performs, based on the third information received from the first SMF network element, the processing method on the uplink data packet of the second application.

Optionally, the third information further includes the second identifier information and second indication information, and the second indication information is used to indicate the second anchor UPF network element to carry the second identifier information in the downlink data packet of the second application when the second anchor UPF network element sends the downlink data packet.

For example, according to the description in step S307, the branching point performs the processing method on the downlink data packet of the second application. When the downlink data packet of the second application belongs to the SDF to be identified through deep packet inspection, the second anchor UPF network element carries the second identifier information in the downlink data packet of the second application when sending the downlink data packet. In this way, the branching point can identify the downlink data packet of the second application based on the second identifier information, and can perform the processing method on the downlink data packet of the second application.

Optionally, the second indication information may be further used to indicate the second anchor UPF network element to delete third rule information, and the third rule information is used to indicate the processing method to be performed by the second anchor UPF network element on the downlink data packet of the second application.

Optionally, after step S307, the method further includes steps S308 and S309.

S308: The second SMF network element sends fourth information to the first anchor UPF network element. Correspondingly, the first anchor UPF network element receives the fourth information from the second SMF network element, where the fourth information is used to indicate the processing method to be performed by the first anchor UPF network element on the uplink data packet of the first application. In other words, the fourth information is a part of the first rule information.

For example, the second SMF network element sends the fourth information to the first anchor UPF network element through an N4 session modification request. The first anchor UPF network element performs, based on the fourth information, the processing method on the uplink data packet of the first application.

Optionally, the second SMF network element sends the first identifier information to the first anchor UPF network element, and the fourth information is further used to indicate the first anchor UPF network element to carry the first identifier information in the downlink data packet of the first application when the first anchor UPF network element sends the downlink data packet.

Optionally, the first SMF network element generates the fourth information according to a first rule information, and sends the fourth information to the first anchor UPF network element corresponding to the DNAI in the first rule information.

S309: The second SMF network element sends fifth information to the branching point. Correspondingly, the branching point receives the fifth information from the second SMF network element, where the fifth information is used to indicate the processing method to be performed by the branching point on the downlink data packet of the first application. In other words, the second SMF network element obtains or generates the fifth information based on the first rule information.

For example, the second SMF network element sends the fifth information to the branching point through an N4 session modification request. The branching point performs, based on the fifth information, the processing method on the downlink data packet of the first application.

Optionally, the fifth information includes the first identifier information.

Optionally, according to the description of the optional content of the second information in step S307, the second information further includes the second rule information, where the second rule information is used to indicate a processing method to be performed by the branching point on the data packet of the second application, and where the data packet of the second application is transmitted through the second anchor UPF network element managed by the first SMF network element. When the downlink data packet of the second application belongs to the SDF to be identified through deep packet inspection, the second information further includes the second identifier information, and the second identifier information is used to identify the data packet of the second application. In this case, the fifth information further includes the second identifier information.

The fifth information further includes tunnel information of the first anchor UPF network element, where the tunnel information is used to establish a tunnel between the branching point and the first anchor UPF network element.

Figure 4:
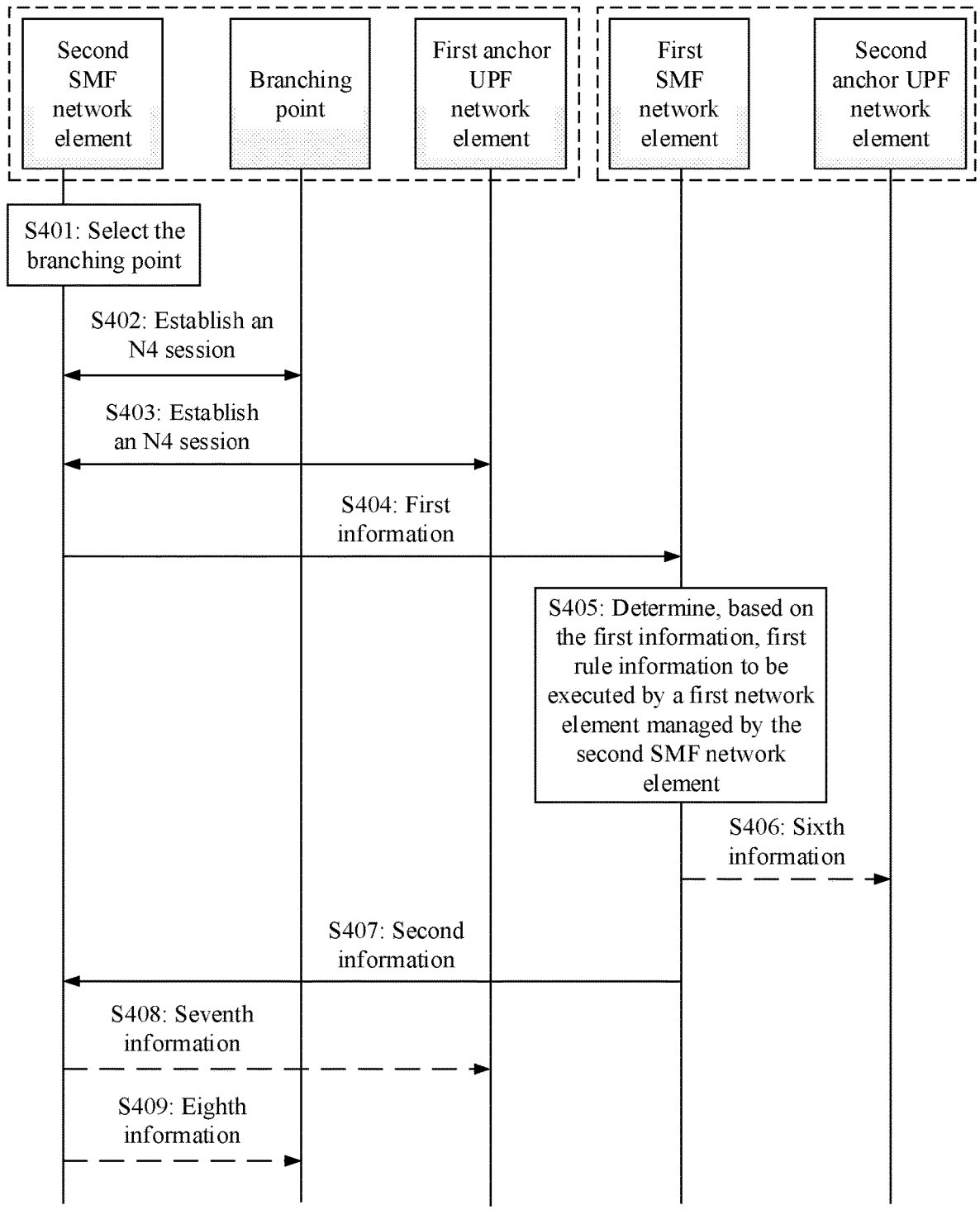
FIG. 4 is a flowchart of still another policy management method according to an embodiment of this application.

FIG. 4 is a flowchart of another policy management method according to an embodiment of this application. The method shown in FIG. 4 is used to describe the implementation (2), applicable to the scenario described in FIG. 1, in step S202 in FIG. 2. To be more specific, a first SMF network element determines, based on first information, that a first anchor UPF network element performs processing methods on an uplink data packet and a downlink data packet of a first application. FIG. 4 provides a description with reference to FIG. 1 to FIG. 3. As shown in FIG. 4, the method may include the following steps.

For steps S401 to S404, refer to the descriptions of steps S301 to S304 in FIG. 3. Details are not described herein again.

After step S404, the method further includes the following steps.

S405: The first SMF network element determines, based on the first information, first rule information to be executed by a first network element managed by the second SMF network element.

As described in the implementation (2) in step S202 in FIG. 2, the first SMF network element determines, based on the first information, that the first anchor UPF network element performs the processing methods on the uplink data packet and the downlink data packet of the first application.

For example, the first rule information may be a PCC rule.

For example, the first information is a DNAI. If the first rule information includes the DNAI in the first information, the first SMF network element determines that a data packet corresponding to the PCC rule is transmitted through the first anchor UPF and the branching point. Therefore, the first SMF network element determines, based on the first information, that the first anchor UPF network element performs the processing methods on the uplink data packet and the downlink data packet of the first application.

S407: The first SMF network element sends second information to the second SMF network element. Correspondingly, the second SMF network element receives the second information from the first SMF network element, where the second information includes the first rule information.

For example, the first SMF network element sends the second information to the second SMF network element through a session update response message.

It should be noted that a format of a message carrying the second information is not limited in this embodiment. For example, the message format may be a PCC rule format, an N4-interface-based message format (for example, a PDR), or another format.

Optionally, the second information further includes one or more of four types of information. For content of the four types of information, refer to the descriptions of the first type of information, the second type of information, the third type of information, and the fourth type of information in step S307 in FIG. 3. Details are not described herein again.

Optionally, as described in FIG. 2, for the implementation (2) in step S202, when the first anchor UPF network element performs the processing method on the downlink data packet of the first application, because the branching point may discard a data packet, the second information further includes first indication information. For example, for content of the second information, refer to the description of the second information in the implementation (2) in the optional step of step S202 in FIG. 2. Details are not described herein again.

Optionally, the second information further includes first identifier information and third indication information, where the first identifier information is used to identify a data packet of the first application, and where the third indication information is used to indicate the second SMF network element to request the first anchor UPF network element to carry the first identifier information in the downlink data packet of the first application when the first anchor UPF network element sends the downlink data packet. When the downlink data packet of the first application belongs to an SDF to be identified through deep packet inspection, the first anchor UPF network element carries the first identifier information in the downlink data packet of the first application when sending the downlink data packet, such that the branching point can identify the downlink data packet of the first application based on the first identifier information, and can collect statistics on a quantity of discarded downlink data packets of the first application.

Optionally, if the first SMF network element determines that the second anchor UPF network element performs processing methods on an uplink data packet and a downlink data packet of a second application, the first indication information is further used to indicate the second SMF network element to request the branching point to report a quantity of discarded downlink data packets of the second application. The downlink data packet of the second application is transmitted sequentially through the second anchor UPF network element managed by the first SMF network element and the branching point. In this way, even if the branching point may discard a data packet, when the second anchor UPF network element performs the processing method on the downlink data packet of the second application, the first SMF network element can determine an actual quantity of downlink data packets of the second application based on packet loss information received from the branching point and a quantity, received from the second anchor UPF network element, of downlink data packets of the second application. This ensures accuracy of the processing method to be performed by the second anchor UPF network element on the downlink data packet of the second application.

Optionally, the second information further includes second identifier information, and the second identifier information is used to identify a data packet of the second application. In this way, the branching point identifies the downlink data packet of the second application based on the second identifier information, and can collect statistics on a quantity of discarded downlink data packets of the second application. According to the method in this embodiment of this application, in the scenario shown in FIG. 1, when a data packet in the area 2 is transmitted not through the second anchor UPF network element in the area 1, the first anchor UPF network element in the area 2 may perform the processing methods on the uplink data packet and the downlink data packet of the first application, or the branching point in the area 2 may perform the processing method on the downlink data packet of the first application. Processing such as charging, usage control, and quality of service control is performed on the data packet in the area 2, to enhance a user data management capability of a core network.

Optionally, after step S405, the method further includes step S406.

S406: The first SMF network element sends sixth information to the second anchor UPF network element. Correspondingly, the second anchor UPF network element receives the sixth information from the first SMF network element, where the sixth information is used to indicate the processing methods to be performed by the second anchor UPF network element on the uplink data packet and the downlink data packet of the second application.

Optionally, the sixth information is further used to indicate the second anchor UPF network element to carry the second identifier information in the downlink data packet of the second application when the second anchor UPF network element sends the downlink data packet.

The sixth information further includes tunnel information of the branching point, where the tunnel information is used to establish a tunnel between the branching point and the second anchor UPF.

Optionally, after step S407, the method further includes steps S408 and S409.

S408: The second SMF network element sends seventh information to the first anchor UPF network element. Correspondingly, the first anchor UPF network element receives the seventh information from the second SMF network element, where the seventh information is used to indicate the processing methods to be performed by the first anchor UPF network element on the uplink data packet and the downlink data packet of the first application.

For example, the second SMF network element generates or obtains the seventh information based on the first rule information.

For example, the second SMF network element sends the seventh information to the first anchor UPF network element through an N4 session modification request. The first anchor UPF network element performs, based on the seventh information, the processing methods on the uplink data packet and the downlink data packet of the first application.

Optionally, the seventh information is further used to indicate the first anchor UPF network element to carry the first identifier information in the downlink data packet of the first application when the first anchor UPF network element sends the downlink data packet.

S409: The second SMF network element sends eighth information to the branching point. Correspondingly, the branching point receives the eighth information from the second SMF network element.

The eighth information is used to indicate the branching point to report the packet loss information, and the packet loss information includes one or more of the quantity of discarded downlink data packets of the first application or the quantity of discarded downlink data packets of the second application.

For example, the second SMF network element sends the eighth information to the branching point through an N4 session modification request. The branching point reports the packet loss information to the first SMF network element based on the eighth information via the second SMF network element.

Optionally, the eighth information includes the first identifier information and the second identifier information.

The eighth information further includes tunnel information of the first anchor UPF network element, where the tunnel information is used to establish a tunnel between the branching point and the first anchor UPF.

Figure 5:
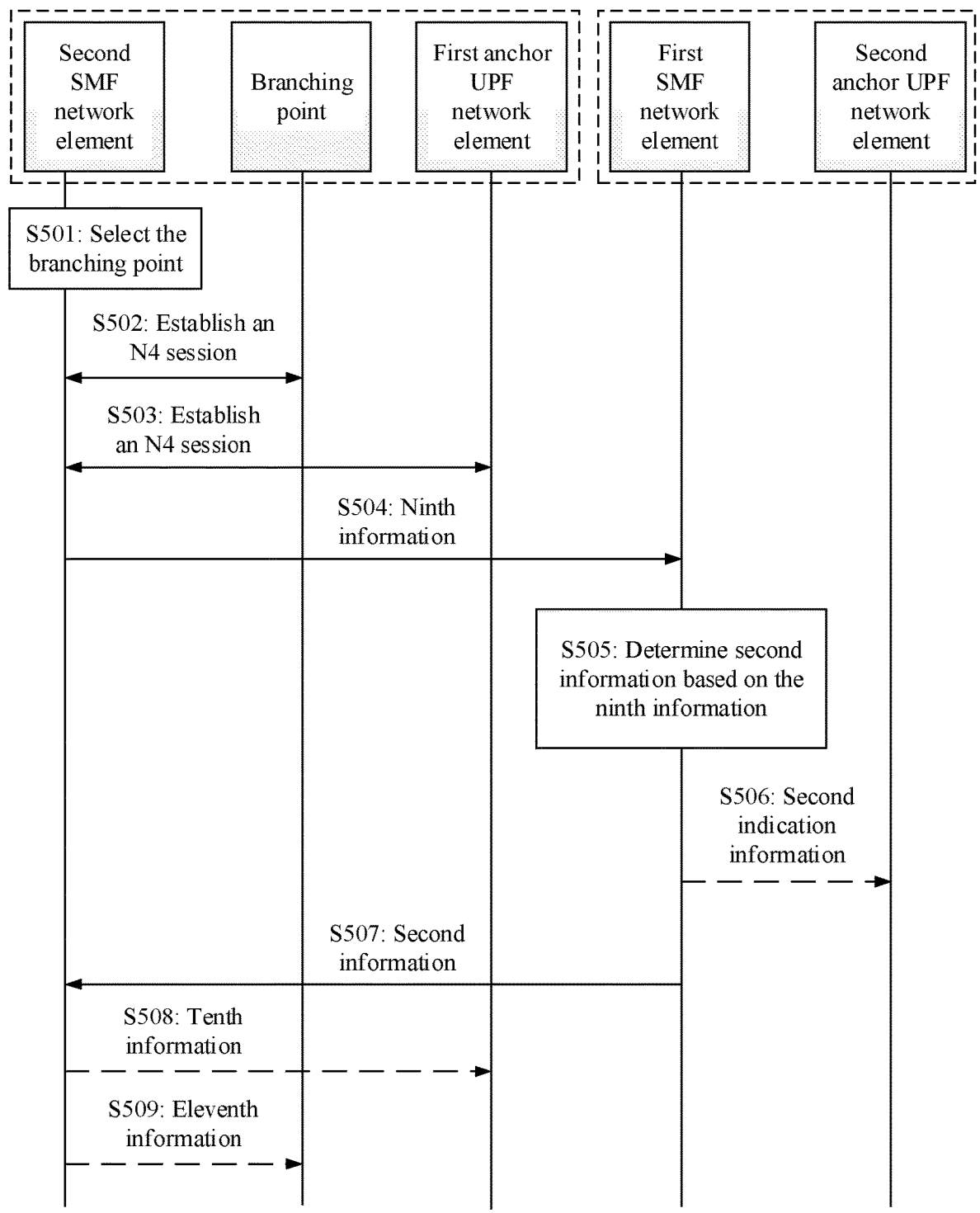
FIG. 5 is a flowchart of yet another policy management method according to an embodiment of this application.

FIG. 5 is a flowchart of still another policy management method according to an embodiment of this application. The method shown in FIG. 5 is used to describe the implementation (4), applicable to the scenario described in FIG. 1, in step S202 in FIG. 2. To be more specific, a first SMF network element determines that a branching point performs processing methods on an uplink data packet and a downlink data packet of a first application. FIG. 5 provides a description with reference to FIG. 1 to FIG. 4. As shown in FIG. 5, the method may include the following steps.

For steps S501 to S503, refer to the description of steps S301 to S303 in FIG. 3. Details are not described herein again.

After step S503, the method further includes the following steps.

S504: The second SMF network element sends ninth information to the first SMF network element. Correspondingly, the first SMF network element receives the ninth information from the second SMF network element, where the ninth information is used to indicate that the second SMF network element has inserted the branching point.

For example, the ninth information may also include a DNAI.

For example, the second SMF network element sends the ninth information to the first SMF network element through a session update request message. The session update request message includes tunnel information of the branching point. The session update request message is used to request to establish a user plane tunnel from a second anchor UPF network element to the branching point.

S505: The first SMF network element determines, based on the ninth information, first rule information to be executed by a first network element managed by the second SMF network element.

For example, the first rule information may be a PCC rule.

In this embodiment, the first SMF network element determines, based on the ninth information, that the branching point performs the processing methods on the uplink data packet and the downlink data packet of the first application. A difference between this embodiment and the embodiments described in FIG. 3 and FIG. 4 is as follows: In FIG. 3 and FIG. 4, the first SMF network element determines, based on the first information, that a data packet corresponding to the first rule information is transmitted through the first anchor UPF and the branching point, and therefore the first SMF network element determines that at least one of the first anchor UPF network element or the branching point performs a processing method on a data packet of the first application. However, in FIG. 5, after the first SMF network element learns that the second SMF network element has inserted the branching point, the first SMF network element determines that the branching point performs processing methods on all data packets (including an uplink data packet and a downlink data packet of the first application, and an uplink data packet and a downlink data packet of a second application).

S507: The first SMF network element sends second information to the second SMF network element. Correspondingly, the second SMF network element receives the second information from the first SMF network element, where the second information includes the first rule information.

For example, the first SMF network element sends the second information to the second SMF network element through a session update response message.

It should be noted that a format of a message carrying the second information is not limited in this embodiment. For example, the message format may be a PCC rule format, an N4-interface-based message format (for example, a PDR), or another format.

Optionally, the second information further includes one or more of three types of information. For content of the three types of information, refer to the descriptions of the first type of information, the second type of information, and the third type of information in step S307 in FIG. 3. Details are not described herein again.

Optionally, as described in FIG. 2, for the implementation (4) in step S202, if the branching point performs the processing methods on the uplink data packet and the downlink data packet of the first application, when at least one of the uplink data packet or the downlink data packet of the first application belongs to an SDF to be identified through deep packet inspection, the second information further includes first identifier information and third indication information. The second SMF network element requests, based on the third indication information, the first anchor UPF network element to carry the first identifier information in the downlink data packet of the first application when the first anchor UPF network element sends the downlink data packet. When receiving the downlink data packet of the first application, a terminal device receives the first identifier information, and the terminal device carries the first identifier information in the uplink data packet of the first application when sending the uplink data packet to the branching point. For example, for content of the second information, refer to the description of the second information in the implementation (4) in the optional step of step S202 in FIG. 2. Details are not described herein again.

Optionally, if the first SMF network element determines that the branching point performs the processing methods on the uplink data packet and the downlink data packet of the second application, when at least one of the uplink data packet or the downlink data packet of the second application belongs to an SDF to be identified through deep packet inspection, the second information further includes second identifier information. The second identifier information is used to identify a data packet of the second application.

According to the method in this embodiment of this application, in the scenario shown in FIG. 1, when a data packet in the area 2 is transmitted not through the second anchor UPF network element in the area 1, the branching point in the area 2 may perform processing methods on an uplink data packet and a downlink data packet in the area 2. Processing such as charging, usage control, and quality of service control is performed on the data packet in the area 2, to enhance a user data management capability of a core network.

Optionally, after step S505, the method further includes step S506.

S506: The first SMF network element sends second indication information to the second anchor UPF network element. Correspondingly, the second anchor UPF network element receives the second indication information from the first SMF network element, where the second indication information is used to indicate the second anchor UPF network element to carry the second identifier information in the downlink data packet of the second application when the second anchor UPF network element sends the downlink data packet.

For step S506, refer to the description of step S307 in FIG. 3. Details are not described herein again.

Optionally, after step S507, the method further includes steps S508 and S509.

S508: The second SMF network element sends tenth information to the first anchor UPF network element. Correspondingly, the first anchor UPF network element receives the tenth information from the second SMF network element. Optionally, the tenth information is used to indicate the first anchor UPF network element to carry the first identifier information in the downlink data packet of the first application when the first anchor UPF network element sends the downlink data packet.

For example, the second SMF network element sends the tenth information to the first anchor UPF network element through an N4 session modification request. When sending the downlink data packet of the first application, the first anchor UPF network element carries the first identifier information in the downlink data packet based on an indication of the tenth information.

S509: The second SMF network element sends eleventh information to the branching point. Correspondingly, the branching point receives the eleventh information from the second SMF network element, where the eleventh information is obtained or generated based on the first rule information, and where the eleventh information is used to indicate processing methods to be performed by the branching point on the data packet of the first application and the data packet of the second application.

For example, the second SMF network element sends the eleventh information to the branching point through an N4 session modification request. The branching point performs, based on the eleventh information, the processing methods on the uplink data packet and the downlink data packet of the first application.

Optionally, the eleventh information includes the first identifier information and the second identifier information.

The eleventh information further includes tunnel information of the first anchor UPF network element, where the tunnel information is used to establish a tunnel between the branching point and the first anchor UPF network element.

In the foregoing embodiments provided in this application, the solutions of the communication method provided in the embodiments of this application are separately described from a perspective of the network elements and from a perspective of interaction between the network elements. It may be understood that, to implement the foregoing functions, the network elements and the devices, for example, the first SMF network element, the second SMF network element, the first anchor UPF network element, the second anchor UPF network element, the branching point, and the terminal device, include corresponding hardware structures and/or software modules for performing the functions. A person skilled in the art should be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 6A:
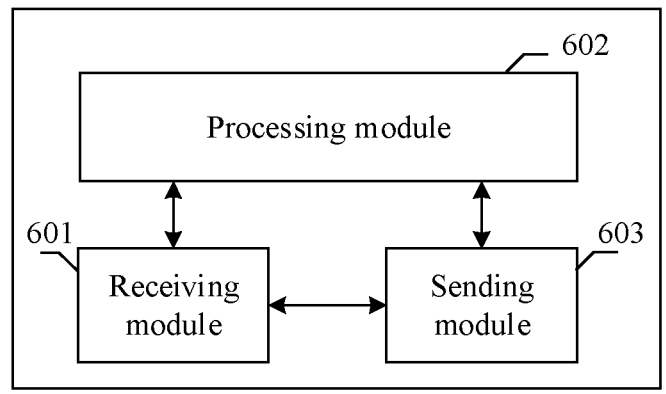
FIG. 6A and FIG. 6B are schematic structural diagrams of a policy management apparatus/terminal device according to an embodiment of this application.

For example, when the foregoing network elements implement the corresponding functions using the software modules, a policy management apparatus may include a receiving module 601, a processing module 602, and a sending module 603, as shown in FIG. 6A.

In an embodiment, the policy management apparatus may be configured to perform an operation of a first SMF network element.

For example, the receiving module 601 is configured to receive first information from a second SMF network element, where the first information is used to indicate a data network to which a first anchor UPF network element managed by the second SMF network element is connected. The processing module 602 is configured to determine, based on the first information, first rule information to be executed by a first network element managed by the second SMF network element, where the first network element includes at least one of the first anchor UPF network element or a branching point, where the branching point is a UPF network element having a traffic offload function, where the branching point is connected to the first anchor UPF network element, where the first rule information is used to indicate a processing method to be performed on a data packet of a first application, and where the data packet of the first application is transmitted through the first anchor UPF network element. The sending module 603 is configured to send second information to the second SMF network element, where the second information includes the first rule information.

In this embodiment of this application, in the scenario shown in FIG. 1, when a data packet in the area 2 is transmitted not through the second anchor UPF network element in the area 1, at least one of the first anchor UPF network element or the branching point in the area 2 may perform a processing method on the data packet in the area 2. Processing such as charging, usage control, and quality of service control is performed on the data packet in the area 2, to enhance a user data management capability of a core network.

Optionally, the second information further includes second rule information, where the second rule information is used to indicate a processing method to be performed by the branching point on a data packet of a second application, and where the data packet of the second application is transmitted through a second anchor UPF network element managed by the first SMF network element and the branching point.

Optionally, the second information further includes second identifier information, and the second identifier information is used to identify the data packet of the second application. The sending module 603 is further configured to send second indication information to the second anchor UPF network element, where the second indication information is used to indicate the second anchor UPF network element to carry the second identifier information in a downlink data packet of the second application when the second anchor UPF network element sends the downlink data packet.

In addition, the receiving module 601 and the sending module 603 in the apparatus may further implement other operations or functions of the first SMF network element. Details are not described herein.

In another embodiment, the policy management apparatus shown in FIG. 6A may be configured to perform an operation of a second SMF network element.

For example, the sending module 603 is configured to send first information to a first SMF network element, where the first information is used to indicate a data network to which a first anchor UPF network element managed by the second SMF network element is connected, where the first information is used to determine first rule information to be executed by a first network element managed by the second SMF network element, where the first network element includes at least one of the first anchor UPF network element or a branching point, where the branching point is a UPF network element having a traffic offload function, where the branching point is connected to the first anchor UPF network element, where the first rule information is used to indicate a processing method to be performed on a data packet of a first application, and where the data packet of the first application is transmitted through the first anchor UPF network element. The receiving module 601 is configured to receive second information from the first SMF network element, where the second information includes the first rule information.

In this embodiment of this application, in the scenario shown in FIG. 1, when a data packet in the area 2 is transmitted not through the second anchor UPF network element in the area 1, at least one of the first anchor UPF network element or the branching point in the area 2 may perform a processing method on the data packet in the area 2. Processing such as charging, usage control, and quality of service control is performed on the data packet in the area 2, to enhance a user data management capability of a core network.

Optionally, the second information further includes second rule information, where the second rule information is used to indicate a processing method to be performed by the branching point on a data packet of a second application, and where the data packet of the second application is transmitted through a second anchor UPF network element managed by the first SMF network element.

Optionally, the second information further includes second identifier information, and the second identifier information is used to identify the data packet of the second application. The sending module 603 is further configured to send the second identifier information to the branching point.

Optionally, the second information further includes first indication information, where the first indication information is used to indicate the second SMF network element to request the branching point to report packet loss information, where the packet loss information includes one or more of a quantity of discarded downlink data packets of the first application or a quantity of discarded downlink data packets of the second application, and where a downlink data packet of the second application is transmitted sequentially through the second anchor UPF network element managed by the first SMF network element and the branching point.

Optionally, if the first rule information is used to indicate the processing method to be performed by the branching point on the data packet of the first application, the second information further includes first identifier information and third indication information, where the first identifier information is used to identify the data packet of the first application, and where the third indication information is used to indicate the second SMF network element to request the first anchor UPF network element to carry the first identifier information in the downlink data packet of the first application when the first anchor UPF network element sends the downlink data packet.

In addition, the receiving module 601 and the sending module 603 in the apparatus may further implement other operations or functions of the second SMF network element. Details are not described herein.

In another embodiment, the policy management apparatus shown in FIG. 6A may be configured to perform an operation of a branching point.

For example, the receiving module 601 is configured to receive indication information from a second SMF network element, where the branching point is a UPF network element having a traffic offload function. The sending module 603 is configured to send packet loss information to the second SMF network element based on the indication information, where the packet loss information includes one or more of the following: a quantity of discarded downlink data packets of a first application or a quantity of discarded downlink data packets of a second application, where a downlink data packet of the first application is transmitted sequentially through a first anchor UPF network element and the branching point that are managed by the second SMF network element, and where a downlink data packet of the second application is transmitted sequentially through a second anchor UPF network element managed by a first SMF network element and the branching point.

In this embodiment of this application, the first SMF network element can determine an actual quantity of downlink data packets of the first application and/or the second application based on the packet loss information received from the branching point and a quantity, obtained through statistics collection by the first anchor UPF network element, of downlink data packets of the first application and/or a quantity, obtained through statistics collection by the second anchor UPF network element, of downlink data packets of the second application. This ensures accuracy of a processing method to be performed on the downlink data packet of the first application and/or the second application.

In addition, the receiving module 601 and the sending module 603 in the apparatus may further implement other operations or functions of the branching point. Details are not described herein.

In another embodiment, the policy management apparatus shown in FIG. 6A may be configured to perform an operation of a branching point.

For example, the receiving module 601 is configured to receive identifier information of a data packet of an application from a first SMF network element via a second SMF network element, where the data packet of the application is transmitted through an anchor UPF network element managed by a third SMF network element, where the branching point is a UPF network element that is managed by the second SMF network element and that has a traffic offload function, and where the branching point is connected to the anchor UPF network element. The receiving module 601 is further configured to receive a downlink data packet of the application from the anchor UPF network element, where the downlink data packet carries the identifier information. The processing module 602 is configured to identify the downlink data packet based on the identifier information carried in the downlink data packet. The first SMF network element is an anchor SMF network element, and the third SMF network element is one or more of the first SMF network element or the second SMF network element.

In this embodiment of this application, when the downlink data packet of the application belongs to an SDF to be identified through deep packet inspection, the anchor UPF network element carries the identifier information in the downlink data packet of the application when sending the downlink data packet. As such, the branching point can identify, based on the identifier information, the downlink data packet corresponding to the application, and can perform a processing method on the downlink data packet of the application.

Optionally, the sending module 603 is configured to send the downlink data packet and the identifier information to a terminal device.

In addition, the receiving module 601, the processing module 602, and the sending module 603 in the apparatus may further implement other operations or functions of the branching point. Details are not described herein.

In another embodiment, the apparatus shown in FIG. 6A may be configured to perform an operation of a terminal device.

For example, the receiving module 601 is configured to receive a downlink data packet and identifier information from a branching point, where the identifier information is used to identify a downlink data packet of an application, and where the branching point is a UPF network element having a traffic offload function. The sending module 603 is configured to send an uplink data packet of the application to the branching point, where the uplink data packet carries the identifier information.

In this embodiment of this application, the branching point performs a processing method on the uplink data packet of the application (for example, a first application and/or a second application). When a data packet of the application belongs to an SDF to be identified through deep packet inspection, the uplink data packet sent by the terminal device to the branching point carries the identifier information, such that the branching point can identify the data packet of the application based on the identifier information, and can perform the processing method on the uplink data packet of the application.

In addition, the receiving module 601 and the sending module 603 in the apparatus may further implement other operations or functions of the terminal device. Details are not described herein.

Figure 6B:
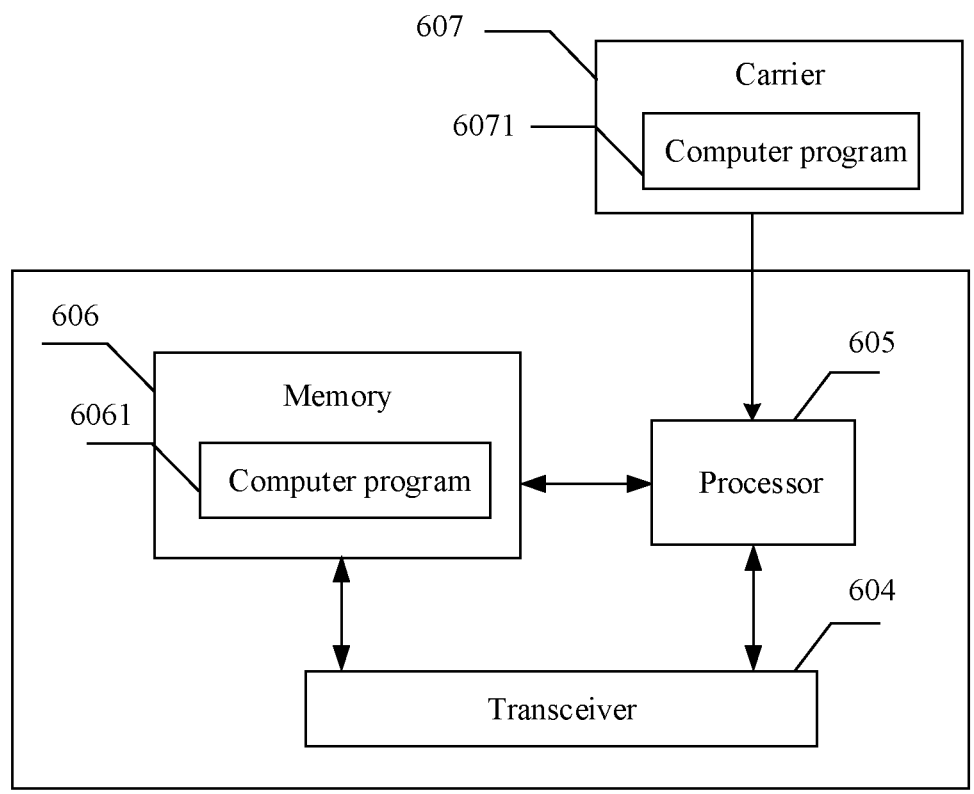

FIG. 6B is another possible schematic structural diagram of a policy management apparatus according to the foregoing embodiment. The policy management apparatus includes a transceiver 604 and a processor 605, as shown in FIG. 6B. For example, the processor 605 may be a general-purpose microprocessor, a data processing circuit, an application-specific integrated circuit (ASIC), or a field-programmable gate array (FPGA) circuit. The policy management apparatus may further include a memory 606. For example, the memory 606 is a random access memory (RAM). The memory 606 is configured to be coupled to the processor 605, and stores a computer program 6061 that is necessary for the policy management apparatus.

In addition, the policy management apparatus in the foregoing embodiment further provides a carrier 607. The carrier 607 is configured to store a computer program 6071 of the policy management apparatus, and can load the computer program 6071 into the processor 605. The carrier 607 may be an optical signal, an electrical signal, an electromagnetic signal, or a computer-readable storage medium (for example, a hard disk).

When the computer program 6061 or the computer program 6071 is run on a computer (for example, the processor 605), the computer is enabled to perform the foregoing methods.

For example, in an embodiment, the processor 605 is configured to perform another operation or function of a first SMF network element. The transceiver 604 is configured to implement communication between the first SMF network element and a second SMF network element/a second anchor UPF network element.

In another embodiment, the processor 605 is configured to perform another operation or function of a second SMF network element. The transceiver 604 is configured to implement communication between the second SMF network element and a first SMF network element/a branching point.

In another embodiment, the processor 605 is configured to perform another operation or function of a branching point. The transceiver 604 is configured to implement communication between the branching point and a second SMF network element/a first SMF network element/a first anchor UPF network element/a terminal device.

In another embodiment, the processor 605 is configured to perform another operation or function of a terminal device. The transceiver 604 is configured to implement communication between the terminal device and a branching point.

One or more of the foregoing modules or units may be implemented using software, hardware, or a combination thereof. When any one of the foregoing modules or units is implemented using software, the software exists in a form of a computer program instruction, and is stored in the memory. The processor may be configured to execute the program instruction to implement the foregoing method procedures. The processor may include but is not limited to at least one of the following computing devices that run various types of software: a central processing unit (CPU), a microprocessor, a digital signal processor (DSP), a microcontroller unit (MCU), an artificial intelligence processor, or the like. Each computing device may include one or more cores configured to perform an operation or processing by executing a software instruction. The processor may be embedded in a system on a chip (SoC) or an ASIC, or may be an independent semiconductor chip. In addition to the core configured to perform an operation or processing by executing a software instruction, the processor may further include a necessary hardware accelerator, for example, an FPGA, a programmable logic device (PLD), or a logic circuit that implements a dedicated logic operation.

When the foregoing modules or units are implemented by hardware, the hardware may be any one or any combination of a CPU, a microprocessor, a DSP, an MCU, an artificial intelligence processor, an ASIC, an SoC, an FPGA, a PLD, a dedicated digital circuit, a hardware accelerator, or a non-integrated discrete device, and the hardware may run necessary software or does not depend on software, to perform the foregoing method procedures.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD), solid state disk, etc.), or the like.

The objectives, technical solutions, and beneficial effects of this application are described in detail in the foregoing example embodiments. It should be understood that the foregoing descriptions are merely example embodiments of this application, but are not intended to limit the protection scope of this application. Any modification, equivalent replacement, or improvement made based on the technical solutions of this application shall fall within the protection scope of this application.

What is claimed is:

1. A method, comprising:
sending, by a second session management function network element, first information to a first session management function network element, wherein the first information indicates a data network to which a first anchor user plane function network element managed by the second session management function network element is connected;
receiving, by the first session management function network element, the first information from the second session management function network element;
determining, by the first session management function network element based on the first information, first rule information to be executed by a first network element managed by the second session management function network element, wherein the first network element comprises at least one of the first anchor user plane function network element or a branching point connected to the first anchor user plane function network element, wherein the branching point is a user plane function network element having a traffic offload function, and wherein the first rule information indicates a first processing method to be performed on a first data packet of a first application;
sending, by the first session management function network element, second information to the second session management function network element, wherein the second information comprises the first rule information, and wherein the second information indicates whether the first network element is the branching point or the first anchor user plane function network element; and
receiving, by the second session management function network element, the second information from the first session management function network element.

2. The method of claim 1, wherein the first information is a data network access identifier (DNAI).

3. The method of claim 1, wherein the second information further comprises second rule information, wherein the second rule information indicates a second processing method to be performed by the branching point on a second data packet of a second application, and wherein the second data packet is transmitted through a second anchor user plane function network element managed by the first session management function network element and the branching point.

4. The method of claim 3, wherein the second information further comprises second identifier information configured to identify the second data packet of the second application, wherein the method further comprises sending, by the first session management function network element, second indication information to the second anchor user plane function network element, and wherein the second indication information instructs the second anchor user plane function network element to carry the second identifier information in a downlink data packet of the second application when the second anchor user plane function network element sends the downlink data packet.

5. The method of claim 1, wherein the second information indicates whether the first network element is the branching point or the first anchor user plane function network element comprises:
when the second information comprises fifth indication information, the first network element is the first anchor user plane function network element; or
when the second information does not comprise the fifth indication information, the first network element is the branching point.

6. The method of claim 5, wherein the fifth indication information is a data network access identifier (DNAI) indicating a data network to which the first anchor user plane function network element is connected.

7. A system, comprising:
a second session management function network element configured to send first information and receive second information; and
a first session management function network element configured to:
receive the first information from the second session management function network element, wherein the first information indicates a data network to which a first anchor user plane function network element managed by the second session management function network element is connected;
determine, based on the first information, first rule information to be executed by a first network element managed by the second session management function network element, wherein the first network element comprises at least one of the first anchor user plane function network element or a branching point connected to the first anchor user plane function network element, wherein the branching point is a user plane function network element having a traffic offload function, and wherein the first rule information indicates a first processing method for a first data packet of a first application; and
send the second information to the second session management function network element, wherein the second information comprises the first rule information, and wherein the second information indicates whether the first network element is the branching point or the first anchor user plane function network element.

8. The system of claim 7, wherein the first information is a data network access identifier (DNAI).

9. The system of claim 7, wherein the second information further comprises second rule information, wherein the second rule information indicates a second processing method to be performed by the branching point on a second data packet of a second application, and wherein the second data packet is transmitted through a second anchor user plane function network element managed by the first session management function network element and the branching point.

10. The system of claim 9, wherein the second information further comprises second identifier information, wherein the second identifier information is configured to identify the second data packet of the second application, wherein the first session management function network element is further configured to send second indication information to the second anchor user plane function network element, and wherein the second indication information instructs the second anchor user plane function network element to carry the second identifier information in a downlink data packet of the second application when the second anchor user plane function network element sends the downlink data packet.

11. The system of claim 7, wherein the second information indicates whether the first network element is the branching point or the first anchor user plane function network element comprises:
when the second information comprises fifth indication information, the first network element is the first anchor user plane function network element; or
when the second information does not comprise the fifth indication information, the first network element is the branching point.

12. The system of claim 11, wherein the fifth indication information is a data network access identifier (DNAI) indicating a data network to which the first anchor user plane function network element is connected.

13. A computer program product comprising instructions stored on a non-transitory computer medium that, when executed by one or more processors, cause a first session management function network element to:
receive first information from a second session management function network element, wherein the first information indicates a data network to which a first anchor user plane function network element managed by the second session management function network element is connected;
determine, based on the first information, first rule information to be executed by a first network element managed by the second session management function network element, wherein the first network element comprises at least one of the first anchor user plane function network element or a branching point connected to the first anchor user plane function network element, wherein the branching point is a user plane function network element having a traffic offload function, and wherein the first rule information indicates a first processing method to be performed on a first data packet of a first application; and
send second information to the second session management function network element, wherein the second information comprises the first rule information, and wherein the second information indicates whether the first network element is the branching point or the first anchor user plane function network element.

14. The computer program product of claim 13, wherein the first information is a data network access identifier (DNAI).

15. The computer program product claim 13, wherein the second information further comprises second rule information indicating a second processing method to be performed by the branching point on a second data packet of a second application.

16. The computer program product of claim 15, wherein the second data packet of the second application is transmitted through a second anchor user plane function network element managed by the first session management function network element and the branching point.

17. The computer program product of claim 16, wherein the second information further comprises second identifier information, and wherein the second identifier information is configured to identify the second data packet of the second application.

18. The computer program product of claim 17, wherein the one or more processors are further configured to execute the instructions to cause the first session management function network element to send second indication information to the second anchor user plane function network element, and wherein the second indication information instructs the second anchor user plane function network element to carry the second identifier information in a downlink data packet of the second application when the second anchor user plane function network element sends the downlink data packet.

19. The computer program product of claim 13, wherein the second information indicates whether the first network element is the branching point or the first anchor user plane function network element comprises:
- when the second information comprises fifth indication information, the first network element is the first anchor user plane function network element; or
- when the second information does not comprise the fifth indication information, the first network element is the branching point.

20. The computer program product of claim 19, wherein the fifth indication information is a data network access identifier (DNAI) indicating a data network to which the first anchor user plane function network element is connected.

* * * * *